United States Patent
Fox, Jr.

(10) Patent No.: US 12,146,349 B2
(45) Date of Patent: Nov. 19, 2024

(54) LEVER-LOCK RELEASE SYSTEMS AND METHODS

(71) Applicant: Roy L. Fox, Jr., Belleville, WV (US)

(72) Inventor: Roy L. Fox, Jr., Belleville, WV (US)

(73) Assignee: Roy L. Fox, Jr., Yuma, AZ (US)

( * ) Notice: Subject to any disclaimer, the term of this patent is extended or adjusted under 35 U.S.C. 154(b) by 326 days.

(21) Appl. No.: 17/345,367

(22) Filed: Jun. 11, 2021

(65) Prior Publication Data
US 2021/0301560 A1  Sep. 30, 2021

Related U.S. Application Data

(63) Continuation of application No. 16/654,732, filed on Oct. 16, 2019, now Pat. No. 11,035,155.

(60) Provisional application No. 62/746,705, filed on Oct. 17, 2018.

(51) Int. Cl.
| E05B 79/20 | (2014.01) |
| E05B 81/14 | (2014.01) |
| E05B 81/24 | (2014.01) |
| F16B 45/02 | (2006.01) |

(52) U.S. Cl.
CPC .............. *E05B 79/20* (2013.01); *E05B 81/14* (2013.01); *E05B 81/25* (2013.01); *F16B 45/026* (2021.05); *F16B 45/028* (2021.05); *F16B 45/034* (2021.05); *Y10S 292/49* (2013.01); *Y10S 292/61* (2013.01); *Y10T 292/0848* (2015.04); *Y10T 292/0857* (2015.04); *Y10T 292/0911* (2015.04); *Y10T 292/0921* (2015.04); *Y10T 292/0922* (2015.04); *Y10T 292/0923* (2015.04); *Y10T 292/0925* (2015.04); *Y10T 292/0945* (2015.04); *Y10T 292/0949* (2015.04); *Y10T 292/1047* (2015.04); *Y10T 292/1082* (2015.04); *Y10T 292/1092* (2015.04); *Y10T 292/14* (2015.04); *Y10T 292/205* (2015.04); *Y10T 292/216* (2015.04); *Y10T 292/57* (2015.04)

(58) Field of Classification Search
CPC .......... E05B 79/20; E05B 81/14; E05B 81/25; F16B 45/02
See application file for complete search history.

(56) References Cited

U.S. PATENT DOCUMENTS

| 1,711,970 A | 12/1875 | Tracy |
| 1,856,390 A | 12/1876 | Johnson |
| 2,326,550 A | 9/1880 | Shaw |
| 3,069,170 A | 10/1884 | Hammond |

(Continued)

OTHER PUBLICATIONS

USPTO; Restriction Requirement in the U.S. Appl. No. 16/654,732 dated Aug. 7, 2020.

(Continued)

*Primary Examiner* — Christine M Mills
*Assistant Examiner* — Faria F Ahmad
(74) *Attorney, Agent, or Firm* — Snell & Wilmer L.L.P.

(57) ABSTRACT

A lever-lock release system is configured to releasably couple two objects together, for example a parachute and a payload. The lever-lock release system may comprise a first lever and a second lever, each rotatably coupled to a rigid base. When activated, the levers cascadingly rotate to release a first object and a second object. With these systems and related methods, various failure modes may be eliminated, such as undesired premature deployment of recovery parachutes during aerial delivery.

11 Claims, 25 Drawing Sheets

(56) References Cited

U.S. PATENT DOCUMENTS

| | | | |
|---|---|---|---|
| 1,920,408 A | 8/1933 | Lafayette | |
| 2,592,647 A * | 4/1952 | Black | E05B 13/10 |
| | | | 49/276 |
| 2,710,999 A | 6/1955 | Davis | |
| 2,904,141 A * | 9/1959 | Henrichs | B64D 29/06 |
| | | | 292/108 |
| 3,141,215 A | 7/1964 | Turolla | |
| 3,148,670 A | 9/1964 | Fiedler et al. | |
| 3,602,723 A * | 8/1971 | Swanson | E05C 19/14 |
| | | | 292/108 |
| 3,985,380 A | 10/1976 | Raivio | |
| 4,134,281 A | 1/1979 | Pelcin | |
| 4,183,564 A * | 1/1980 | Poe | E05C 19/145 |
| | | | 292/DIG. 31 |
| 4,268,077 A | 5/1981 | Bohleen | |
| 4,337,913 A | 7/1982 | Booth | |
| 4,538,843 A * | 9/1985 | Harris | B64D 29/06 |
| | | | 292/DIG. 31 |
| 4,602,812 A * | 7/1986 | Bourne | E05C 19/145 |
| | | | 292/DIG. 60 |
| 4,638,649 A | 1/1987 | Chao | |
| 4,828,850 A | 5/1989 | Davis | |
| 4,858,970 A * | 8/1989 | Tedesco | E05C 19/145 |
| | | | 292/DIG. 31 |
| 5,016,931 A * | 5/1991 | Jackson | E05B 15/025 |
| | | | 411/7 |
| 5,257,839 A * | 11/1993 | Nielsen | E05C 19/14 |
| | | | 292/205 |
| 5,430,914 A | 7/1995 | Patterson | |
| 5,620,212 A * | 4/1997 | Bourne | E05C 19/145 |
| | | | 292/DIG. 31 |
| 5,713,482 A | 2/1998 | Bordner | |
| 5,765,883 A | 6/1998 | Dessenberger | |
| 5,984,382 A * | 11/1999 | Bourne | E05C 19/145 |
| | | | 292/DIG. 31 |
| 6,279,971 B1 | 8/2001 | Dessenberger | |
| 6,325,428 B1 | 12/2001 | Do | |
| 6,343,815 B1 | 2/2002 | Poe | |
| 6,419,286 B1 | 7/2002 | Szablewski | |
| 6,428,058 B1 | 8/2002 | Graute | |
| 6,844,210 B2 | 1/2005 | Fukuoka et al. | |
| 7,631,140 B2 | 12/2009 | Saito et al. | |
| 8,608,112 B1 * | 12/2013 | Levay | B64D 17/343 |
| | | | 244/150 |
| 8,864,185 B2 * | 10/2014 | Do | E05C 19/145 |
| | | | 292/DIG. 60 |
| 9,004,548 B2 | 4/2015 | Jaret | |
| 9,415,876 B1 * | 8/2016 | Baic | E05C 1/145 |
| 9,567,784 B2 * | 2/2017 | Defrance | E05C 19/145 |
| 9,677,306 B2 * | 6/2017 | DeFrance | B64D 29/06 |
| 9,789,968 B1 | 10/2017 | Fox | |
| 10,392,830 B2 | 8/2019 | Helsley | |
| 10,604,256 B2 | 3/2020 | Gad | |
| 2004/0140676 A1 | 7/2004 | Eklund | |
| 2008/0129056 A1 | 6/2008 | Hernandez | |
| 2009/0206195 A1 * | 8/2009 | Colich | B64D 19/02 |
| | | | 244/76 R |
| 2009/0302164 A1 * | 12/2009 | Fox, Jr. | B64D 1/12 |
| | | | 701/4 |
| 2011/0101710 A1 | 5/2011 | Elbrecht | |
| 2012/0228432 A1 * | 9/2012 | Fox, Jr. | B64D 17/22 |
| | | | 244/137.1 |
| 2013/0112813 A1 * | 5/2013 | Tardiff | B64D 1/12 |
| | | | 244/137.4 |
| 2013/0146713 A1 | 6/2013 | Fitzgerald | |
| 2015/0021933 A1 | 1/2015 | Shin | |
| 2015/0184543 A1 | 7/2015 | Fabre | |
| 2016/0017912 A1 | 2/2016 | Jang | |
| 2016/0150360 A1 | 5/2016 | Pope | |
| 2017/0251652 A1 | 9/2017 | Novak | |
| 2018/0017095 A1 | 1/2018 | Chang | |
| 2018/0035830 A1 | 2/2018 | Arakawa | |
| 2020/0062553 A1 | 2/2020 | Toon | |
| 2020/0123815 A1 | 4/2020 | Fox, Jr. | |
| 2020/0138189 A1 | 5/2020 | Canova | |
| 2022/0024597 A1 * | 1/2022 | Fox, Jr. | B64D 17/386 |
| 2022/0135238 A1 * | 5/2022 | Fox, Jr. | B64D 17/386 |
| | | | 244/149 |

OTHER PUBLICATIONS

USPTO; Non-Final Office Action in the U.S. Appl. No. 16/654,732 dated Nov. 25, 2020.

USPTO; Notice of Allowance in the U.S. Appl. No. 16/654,7320 dated Mar. 23, 2021.

* cited by examiner

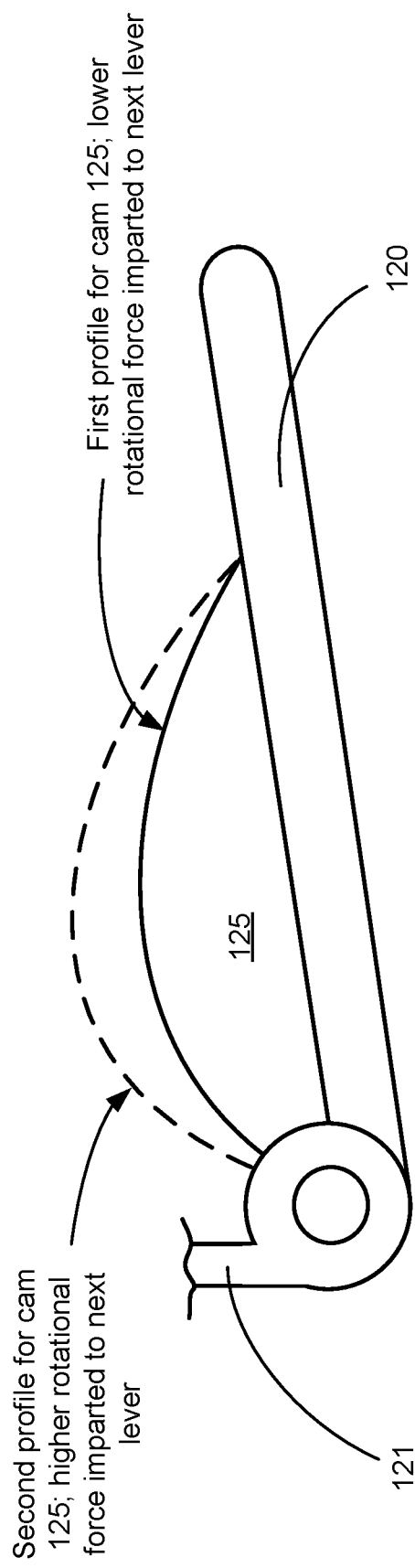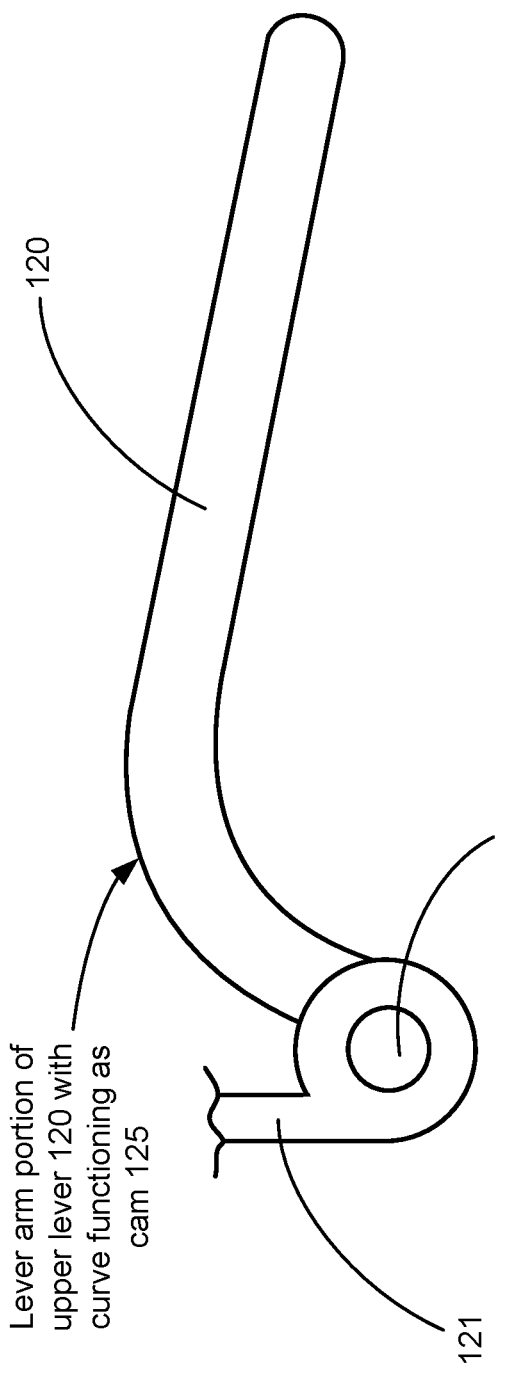
FIG. 6D
FIG. 6E (end view)**

(end view)

LEVER-LOCK RELEASE SYSTEMS AND METHODS

CROSS-REFERENCE TO RELATED APPLICATIONS

This application is a continuation of U.S. Ser. No. 16/654,732 filed on Oct. 16, 2019, now U.S. Pat. No. 11,035,155 entitled "LEVER-LOCK RELEASE SYSTEMS AND METHODS." U.S. Ser. No. 16/654,732 is a non-provisional of, and claims priority to and the benefit of, U.S. Ser. No. 62/746,705 filed Oct. 17, 2018 and entitled "LEVER-LOCK RELEASE SYSTEMS AND METHODS." Each of the foregoing applications are hereby incorporated by reference in its entirety for all purpose, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to release systems, and particularly to systems and methods for releasing coupled objects from one another.

BACKGROUND

Prior release systems have been utilized, for example in aerial delivery in connection with deployment of a main parachute after an extraction parachute has extracted a payload from an aircraft. However, these and other prior release systems suffer from various deficiencies. More generally, a variety of situations may arise where two coupled objects may desirably be retained together and/or released from one another. Accordingly, improved release systems and methods of use thereof are desirable.

SUMMARY

Lever-lock release systems and methods for use of the same are provided. In an exemplary embodiment, a lever-lock release system comprises a rigid base, a first lever coupled to the rigid base such that the first lever is rotatable with respect to the base, and a second lever coupled to the rigid base such that the second lever is rotatable with respect to the base. The first lever comprises a first hook and a first aperture, the second lever comprises a second aperture, and when the first lever is in a first rotational position with respect to the base, the first hook extends at least partially through the second aperture to retain the second lever in a fixed position.

In another exemplary embodiment, a method of deploying a platform from an aircraft comprises coupling an extraction parachute and a recovery parachute to the platform, coupling a lever-lock release system to the deployment line of the recovery parachute (the lever-lock release system being in an unlocked state), and deploying the extraction parachute to generate a force to urge the platform to exit the aircraft. The method further comprises activating, responsive to the platform reaching a desired location as it exits the aircraft, a mechanism to place the lever-lock release system into a locked state, and transferring, via the lever-lock release system, a force to the deployment line of the recovery parachute to cause the recovery parachute to deploy.

The contents of this summary section are provided only as a simplified introduction to the disclosure and are not intended to be used to limit the scope of the appended claims.

BRIEF DESCRIPTION OF THE DRAWINGS

With reference to the following description, appended claims, and accompanying drawings:

FIG. 6D illustrates cam profiles of an upper lever of an exemplary lever-lock release system in accordance with various exemplary embodiments;

FIG. 6E illustrates an upper lever of an exemplary lever-lock release system where side rails of the upper lever implement a cam function in accordance with various exemplary embodiments;

DETAILED DESCRIPTION

Figure 1A:
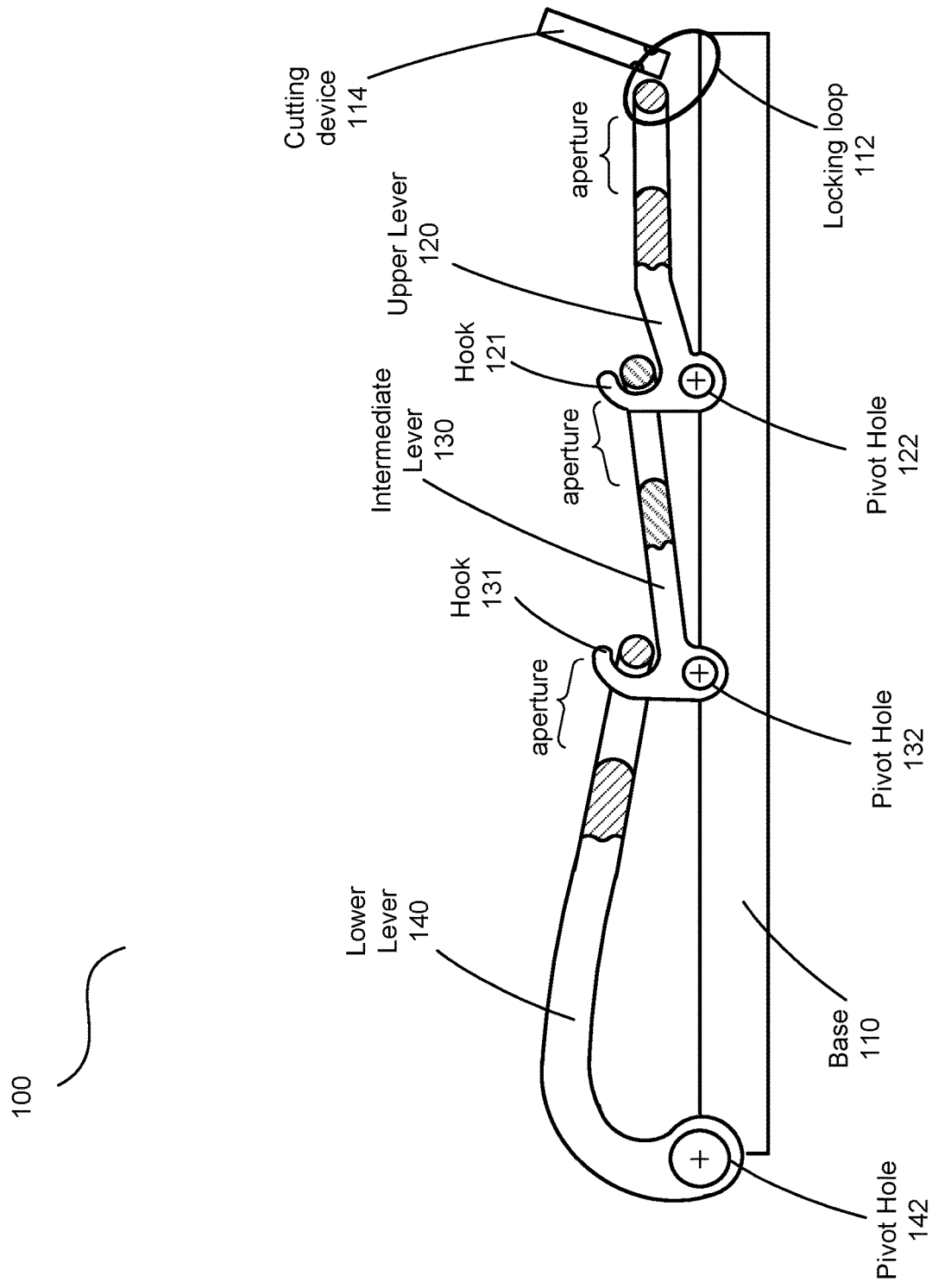
FIG. 1A illustrates components of a lever-lock release system in accordance with an exemplary embodiment.
Figure 1B:
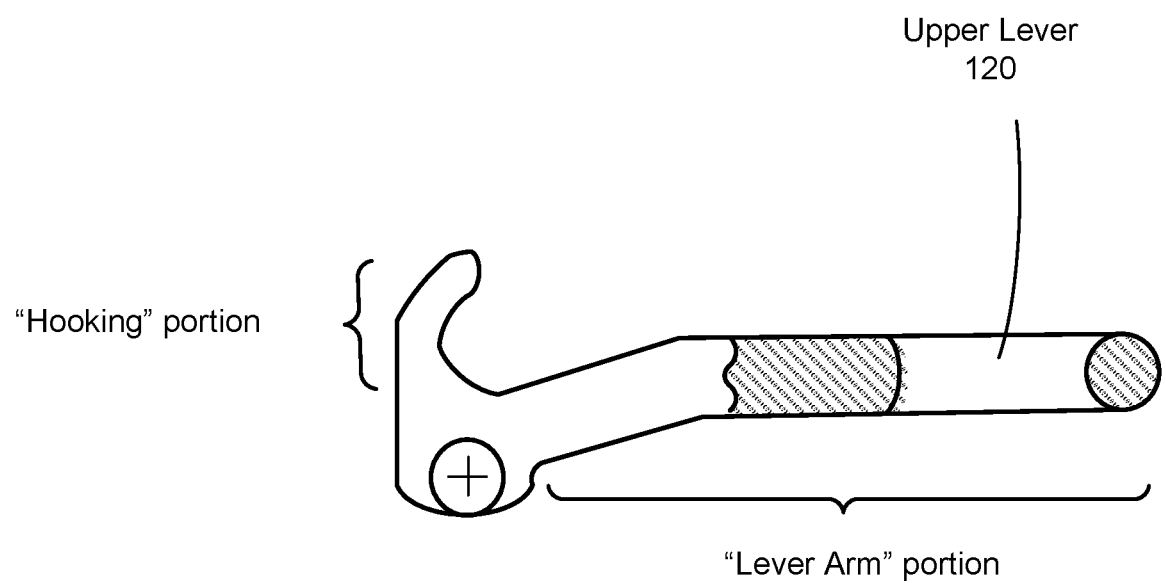
FIG. 1B illustrates a lever of a lever-lock release system in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for release systems, parachute construction, deployment, reefing, disreefing, release, recovery, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical lever-lock release system and/or related methods of use.

During aerial delivery operations, a parachute extraction system is coupled to an aerial delivery platform, typically until the moment the platform is pulled off the ramp of the aerial delivery aircraft. Then, just as the extraction system pulls the platform off the aircraft ramp, a portion of the apparatus that couples the extraction system to the platform is caused to automatically decouple, for example by use of a spring-loaded triggering device. Solidly attached to the decoupling portion of the apparatus is a recovery parachute deployment line that remains slack until the decoupling event occurs. At that point, the force that was being applied by the extraction system for pulling the platform out of the aircraft is redirected to the recovery parachute deployment line. This force transfer causes all slack to be pulled from the deployment line, and consequently deploys a recovery parachute system to which the opposite end of the deployment line is attached.

On occasion, however, there is a malfunction and the decoupling event occurs early, for example immediately upon the force from the inflating extraction parachutes reaching the decoupling apparatus. At that time, the platform is still in the aircraft, but the deployment line becomes taut and the recovery parachutes are deployed. The result of this unplanned event is colloquially known as "extraction by mains." Because the recovery parachutes produce tremendously more drag than do the extraction parachutes, during an extraction by mains event the platform and aircraft are exposed to a much higher extraction force than they were designed to withstand. Additionally, because the platform suspension slings are typically arranged to couple at the corners of the platform, the extraction force applied by the recovery parachutes is concentrated in the front suspension slings. This causes the platform to tend to perform a backflip as it travels toward the rear of the aircraft. This undesirable event has the potential to damage the aircraft structure and put the lives of the aircraft crew in jeopardy. Even if no aircraft damage arising from an extraction by mains event is initially detected, the aircraft must undergo a very thorough inspection process, and be repaired, if necessary, before the aircraft can again be considered airworthy.

Conventional release systems have offered limited or no ability to prevent an extraction by mains event. In contrast, via application of principles of the present disclosure, premature deployment of recovery parachutes can be significantly reduced and/or eliminated, thus reducing and/or eliminating extraction by mains events.

Prior ring-style release devices typically comprised a series of rings acting as interconnected levers, plus a locking/releasing textile cord, which are incorporated into a riser assembly, typically made of a flexible textile material. Because typical ring release devices have their rings attached to flexible textile webbing, those assemblies can fold and twist into configurations that are very unlike their intended tension-loaded inline configuration. Therefore, these devices must have their rings passing completely through one another to prevent them from disengaging before they receive their release initiation input. In contrast, the ring-levers of exemplary lever-lock release devices as disclosed herein, having a rigid mount, cannot suffer from this problem and, therefore, the ring-levers do not require the same degree of inter-connectivity to remain properly configured until the release initiation input is received. That, in turn, allows both the locking and unlocking processes to be more precise.

Moreover, exemplary lever-lock release systems require only a small amount of rotation of a particular lever (for example, about 20 degrees or so) to achieve release; in contrast, a cascading ring-through-ring system requires approximately 180 degrees of rotation before a particular ring releases the ring it had been securing. This limited rotation ability can be desirable, for example, in confined spaces where room for full rotation may not be available. Yet further, when an exemplary lever-lock release system is utilized in an initially "unlocked/unlatched" configuration and then transitions into a "locked/latched" configuration, the locking process is much simpler than for a cascading ring system. Also, in an exemplary lever-lock release system, all levers except the lower lever may be identical to one another, in contrast to cascading ring systems where each ring must be sized to fit through the next ring. Still further, in an exemplary lever-lock release system, rotation of a lever can impart a rotational force to the next lever in the series, unlike a cascading ring system, which cannot have such a capability.

Principles of the present disclosure may be compatible with and/or utilize certain components or techniques disclosed in U.S. Pat. No. 9,789,968 to Fox, the contents of which are hereby incorporated by reference in their entirety (except for any subject matter disclaimers or disavowals, and except to the extent that the incorporated material is inconsistent with the express disclosure herein, in which case the language in this disclosure shall control).

During deployment of an aerial delivery platform from an aircraft, if the deployment line is properly positioned on the decoupling portion of the coupling/decoupling apparatus, but temporarily not securely connected to it, and if the decoupling event occurred prematurely, the extraction system drag force could not transfer into the deployment line and, therefore, could not deploy the recovery parachutes. It will be appreciated that the properly positioned, but not securely connected, deployment line would have to later become solidly connected, for example a moment prior to the platform departing the aircraft, in order to allow the recovery parachutes to be deployed. To achieve such a configuration and operational result, an exemplary lever-lock release system as disclosed herein may be utilized.

In contrast to the approaches and drawbacks of prior release systems, improved performance and safety may be achieved via use of lever-lock release systems configured in accordance with principles of the present disclosure. For example, as compared to prior release systems, an exemplary lever-lock release system 100 offers improved ease of use, simpler assembly and verification, as well as greater flexibility with respect to component sizes, load bearing capacity, and so forth.

With reference now to FIGS. 1A through 1E, in accordance with various exemplary embodiments a lever-lock release system 100 may comprise one or more oblong, rectangular, and/or trapezoidal (elongated) levers, particularly when lever-lock release system 100 is configured for use with large and/or heavy loads. It will be appreciated that such a change may (but does not necessarily) decrease the length of lever-lock release system 100 as compared to a prior system, but it will decrease the width of lever-lock release system 100 relative to its length, as compared to a prior system. Additionally, in various exemplary embodiments an elongated lower lever 140 is configured with the novel capability of interfacing with (and conveniently releasing from) flexible materials, such as textile loops, without the need for a base ring to act as an interface.

In an exemplary lever-lock release system, for example lever-lock release system 100, a lever can typically produce relatively higher mechanical advantage than a correspondingly placed ring because the length of the lever arm can be significantly greater than the width. Additionally, a lower lever 140 can be more conveniently configured to cleanly release from a flexible loop than can a circular ring.

In various exemplary embodiments, lever-lock release system 100 comprises components configured to releasably connect two or more objects, for example a parachute to a payload, a deployment line, and/or the like. With reference now to FIG. 1A, in an exemplary embodiment lever-lock release system 100 comprises a base 110, a locking loop 112, a cutting device 114, upper lever 120, intermediate lever 130, and lower lever 140. With momentary reference to FIG. 1D, in some exemplary embodiments lever-lock release system 100 is configured with a retractable and/or extendable pin 170 in place of locking loop 112 and cutting device 114.

In various exemplary embodiments, base 110 comprises a rigid or semi-rigid material, such as metal, plastic, wood, or the like. In one exemplary embodiment, base 110 comprises a forged, high-strength steel alloy. However, any suitable rigid material(s) may be utilized to form base 110, such as aluminum, plastic, titanium, or the like. Moreover, base 110 may be configured with various apertures, loops, threads, and/or the like, in order to allow base 110 to be coupled to other components of lever-lock release system 100 or external components or systems. In lever-lock release system 100, base 110 may be operative as a substrate or platform to which various other components are affixed.

With continued reference to FIG. 1A, in various exemplary embodiments lever-lock release system 100 comprises a locking loop 112 coupled to base 110. Locking loop 112 may comprise a textile loop that is secured by having a releasing pin routed through it. Alternatively, locking loop 112 may be coupled to a cutting device 114, for example when lever-lock release system 100 is utilized in connection with parachute delivered cargo.

Upper lever 120 comprises a durable metal, for example aluminum, steel, titanium, plastic, or the like. Upper lever 120 may be elongated, ovoid, rectangular, or any other suitable shape depending on the amount of mechanical advantage that is desired by the system designer. In general, upper lever 120 is configured with a "lever arm" portion, which may be straight, bent, and/or curved, and with a "hooking" portion, which likewise may be straight, bent, or curved (but is typically curved). The lever arm portion and the hooking portion extend generally in different directions with respect to pivot hole 122, and upper lever 120 is rotatable about pivot hole 122.

In an exemplary embodiment, upper lever 120 comprises a forged steel alloy and is configured with dimensions of about 2" in width and about 4" in length. However, upper lever 120 may be configured as any appropriate size, for example depending on the materials used, the desired load bearing capacity, and so forth. Upper lever 120 is configured with a hook 121 at one end thereof. Hook 121 is configured to pass at least partially through or into an aperture or cavity in the lever arm portion of intermediate lever 130 and, depending on a rotational position of upper lever 120, either retain intermediate lever 130 in a particular position, or permit intermediate lever 130 to rotate. Hook 121 may be curvilinear, angled, angular, and/or otherwise shaped in any suitable manner in order to releasably retain a portion of intermediate lever 130.

Figure 1C:
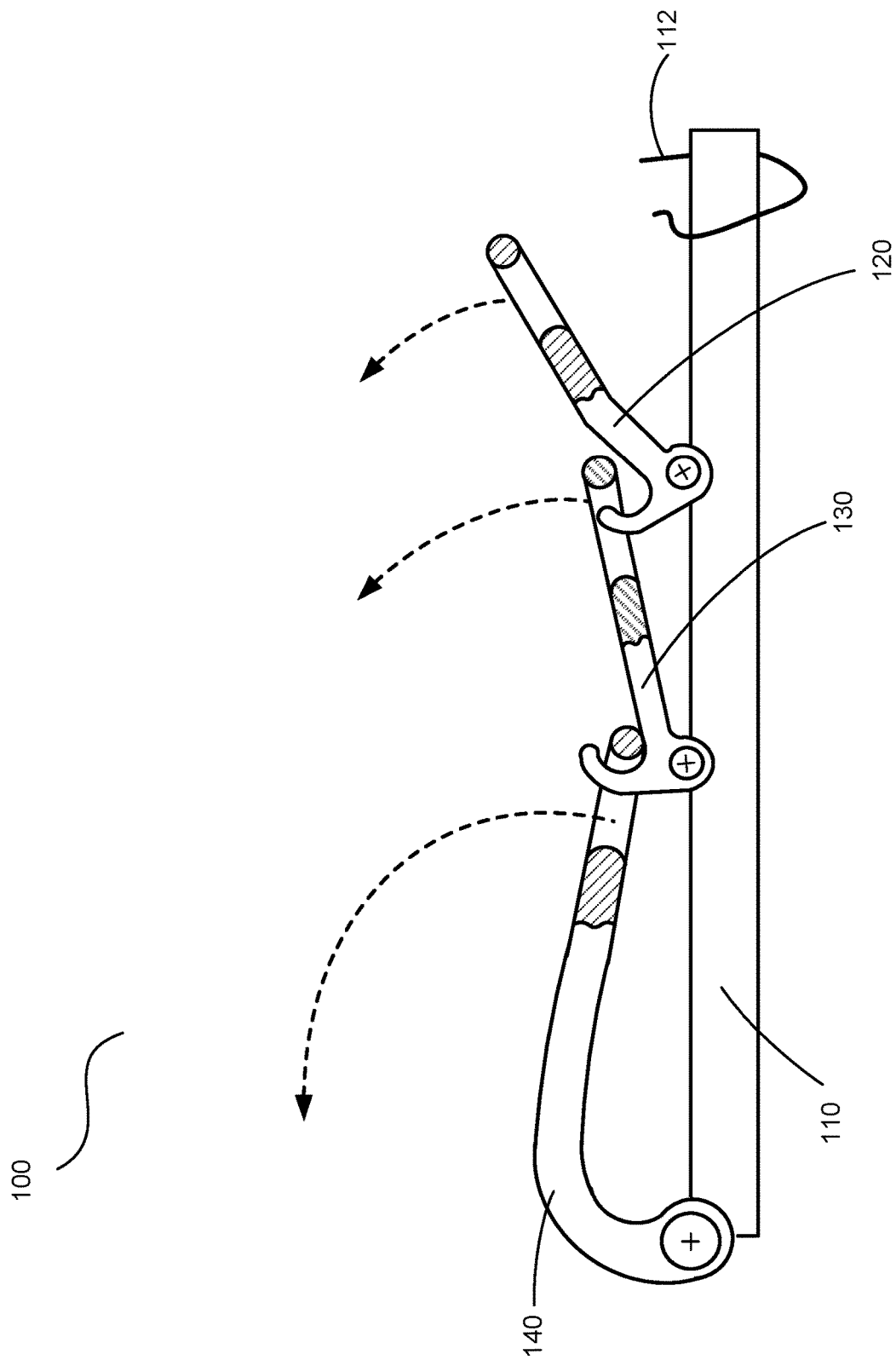
FIG. 1C illustrates operation of components of a lever-lock release system in accordance with an exemplary embodiment.

Upper lever 120 is coupled to base 110, for example via a bolt passing through pivot hole 122. In this manner, upper lever 120 is rotatably retained to base 110. By allowing upper lever 120 to rotate, pivot hole 122 facilitates separation of upper lever 120 from intermediate lever 130 responsive to release of locking loop 112, for example as illustrated in FIG. 1C. In an exemplary embodiment, intermediate lever 130 is separable from upper lever 120 once upper lever 120 has rotated about 20 degrees. It will be appreciated that the dimensions of hook 121 may be varied somewhat in order to achieve a release event after a desired amount of rotation, for example 15 degrees, 25 degrees, 30 degrees, 35 degrees, or the like.

Figure 7A:
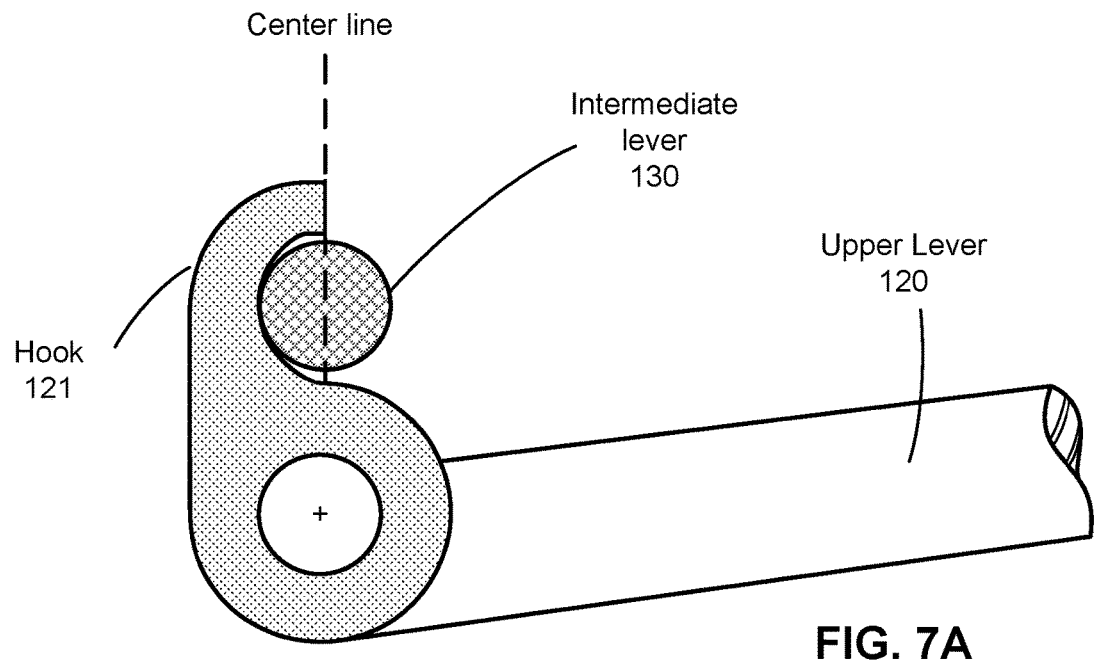
FIGS. 7A, 7B, and 7C illustrate configuration of a hook element of an exemplary lever-lock release system in accordance with various exemplary embodiments.
Figure 7B:
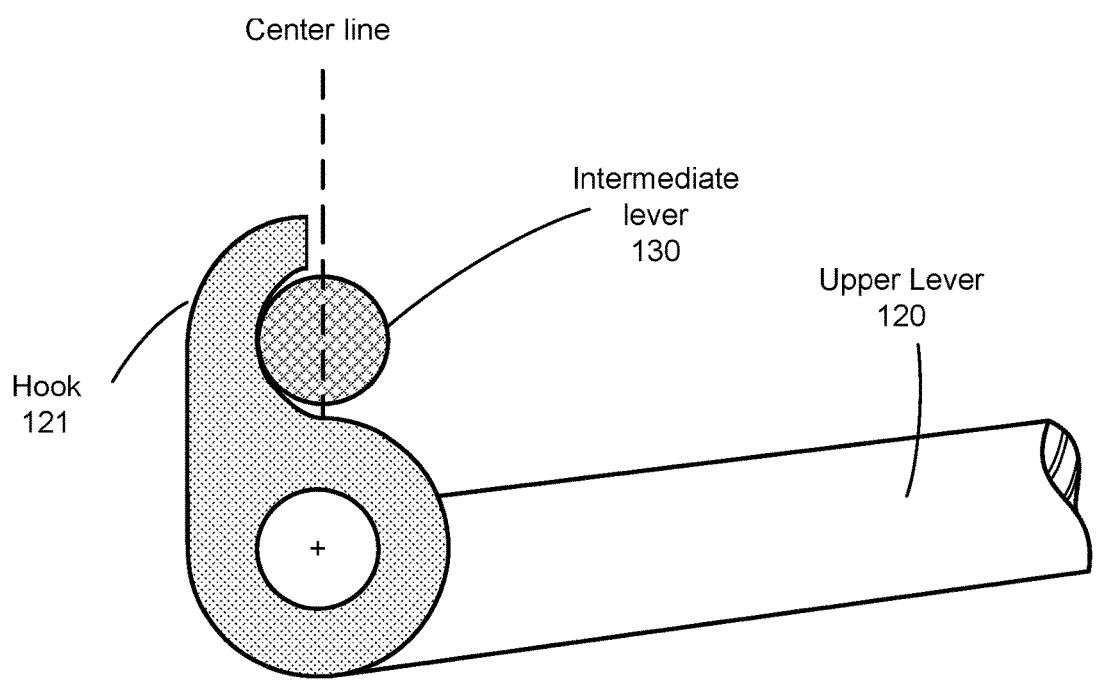
Figure 7C:
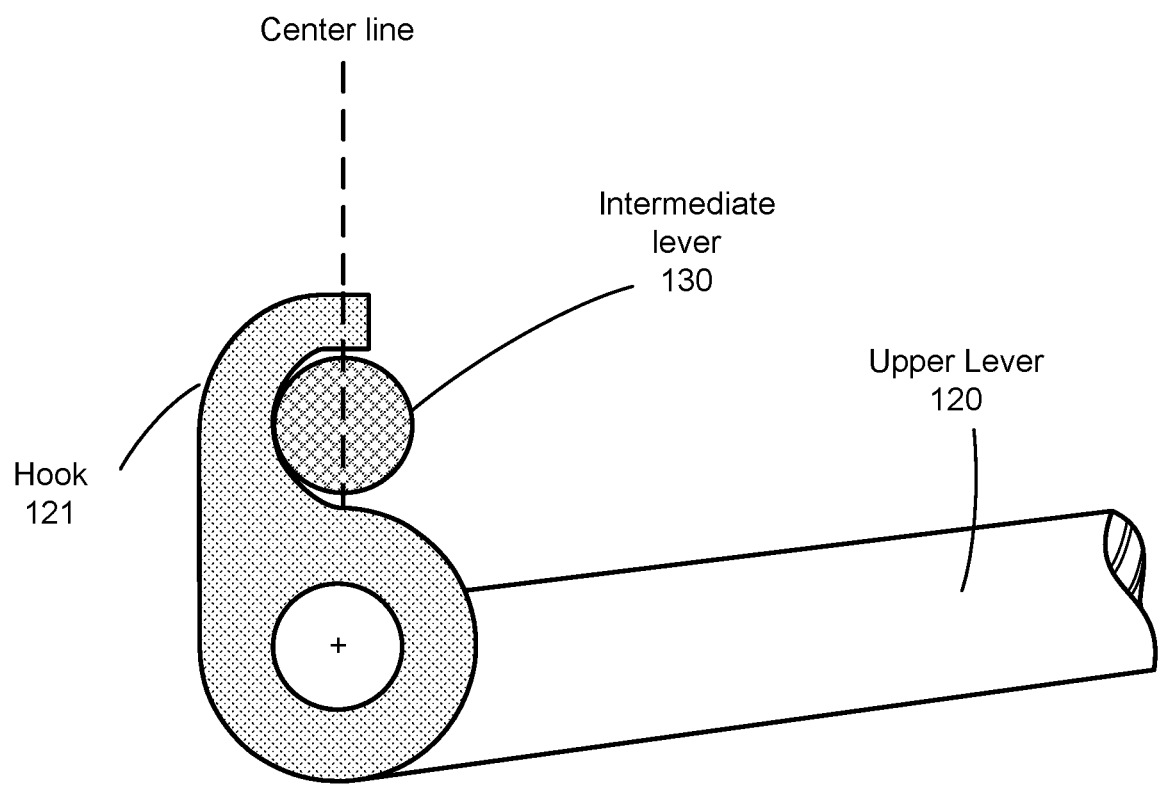

Moreover, with momentary reference to FIG. 7A, in various exemplary embodiments hook 121 is configured to pass at least partially through or into an aperture or cavity in the lever arm portion of intermediate lever 130 such that the distal edge of hook 121, the center of pivot hole 122, and center of the portion of intermediate lever 130 retained by hook 121 share a common line. In other exemplary embodiments, for example as illustrated in FIG. 7B, the distal edge of hook 121 does not extend fully to the common line shared by the center of pivot hole 122 and center of the portion of intermediate lever 130 retained by hook 121; it will be appreciated that, in these exemplary embodiments, release of intermediate lever 130 is obtained by a lesser degree of rotation of upper lever 120 as compared to the embodiments depicted in FIG. 7A. Moreover, in yet other exemplary embodiments, for example as illustrated in FIG. 7C, the distal edge of hook 121 extends past the common line shared by the center of pivot hole 122 and center of the portion of intermediate lever 130 retained by hook 121; it will be appreciated that, in these exemplary embodiments, release of intermediate lever 130 is obtained by a greater degree of rotation of upper lever 120 as compared to the embodiments depicted in FIG. 7A or FIG. 7B.

In various exemplary embodiments, intermediate lever 130 comprises a durable material, for example steel, aluminum, titanium, plastic, and/or the like. Intermediate lever 130 may be configured and sized in a manner similar to upper lever 120 and have a corresponding hook 131; moreover, intermediate lever 130 may be larger, longer, and/or thicker than upper lever 120, as needed, in order to accommodate a desired operational capacity for lever-lock release system 100. Moreover, intermediate lever 130 and hook 131 may be configured as any appropriate size, for example depending on the materials used, the desired load bearing capacity, and so forth.

Intermediate lever 130 is coupled to base 110, for example via a bolt passing through pivot hole 132. In this manner, intermediate lever 130 is rotatably retained to base 110. By allowing intermediate lever 130 to rotate, pivot hole 132 facilitates separation of intermediate lever 130 from upper lever 120 as well as from lower lever 140 responsive to release of locking loop 112, for example as illustrated in FIG. 1C.

In various exemplary embodiments, lever-lock release system 100 is configured with lower lever 140. When lower lever 140 is released from hook 131 of intermediate lever 130, lower lever 140 is rotatable about pivot hole 142. In various exemplary embodiments, lower lever 140 is configured with a "letter J" like shape when viewed from the side. In one exemplary embodiment, wherein lower lever 140 comprises steel, lower lever 140 is configured with a width of 2" and a length of 5.75". However, lower lever 140 may be configured as any appropriate size, for example depending on the materials used, the desired load bearing capacity, and so forth.

In various exemplary embodiments, lower lever 140 comprises steel. Lower lever 140 may also comprise aluminum, titanium, plastic or other durable material. Lower lever 140 (and other levers disclosed herein) may be monolithic, for example a single cast, forged, and/or machined piece of metal. Alternatively, lower lever 140 may comprise multiple components coupled together.

In various exemplary embodiments, in lever-lock release system 100 upper lever 120 is secured in a latched position via locking loop 112 and can be released via operation of cutting device 114. Moreover, any suitable release mechanism may be utilized, including electrical, explosive, and/or remotely-triggerable release components.

Figure 4:
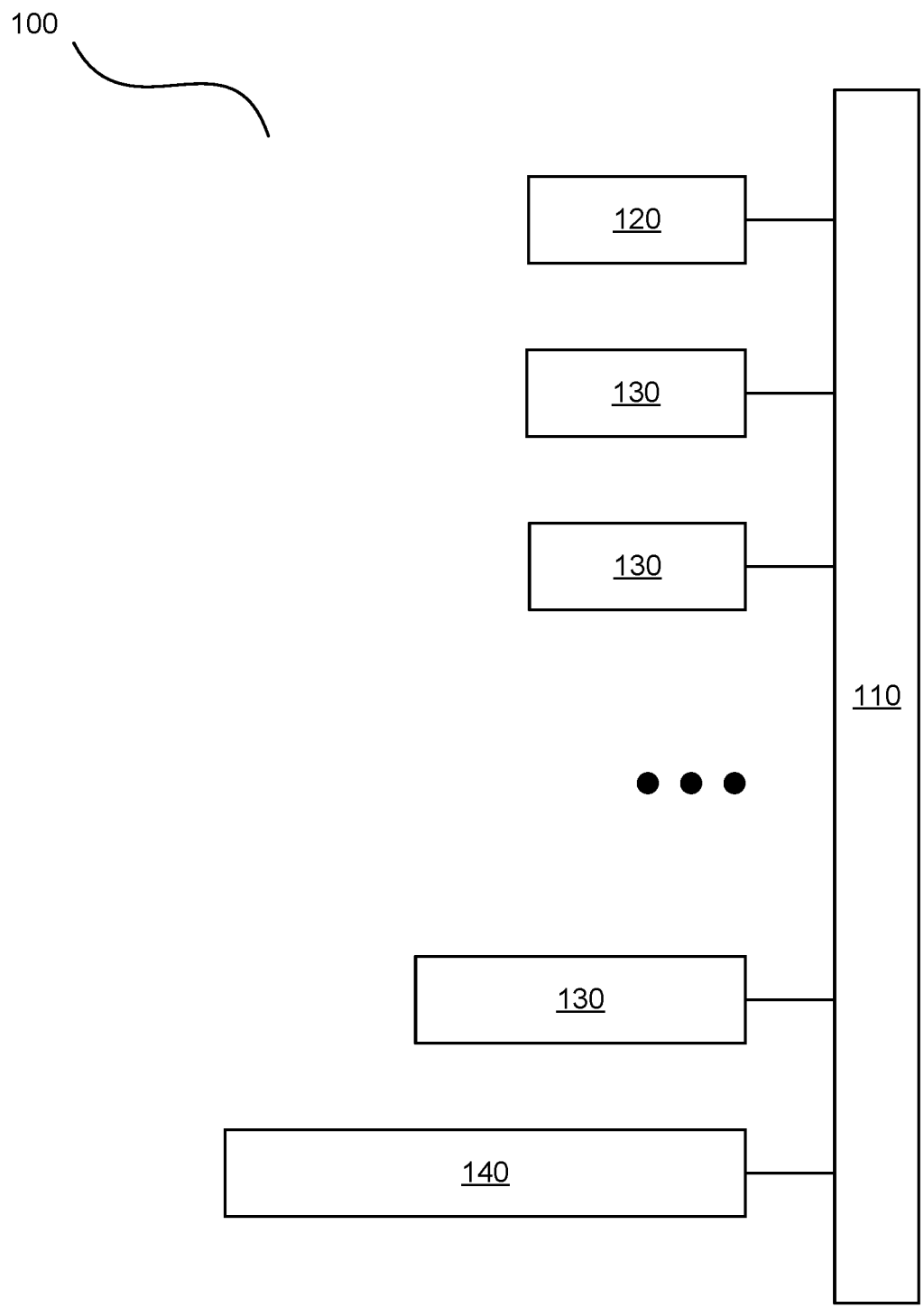
FIG. 4 illustrates a lever-lock release system having multiple intermediate levers in accordance with various exemplary embodiments.

Turning now to FIG. 1C, in some exemplary embodiments, lever-lock release system 100 is configured with an upper lever 120, an intermediate lever 130, and a lower lever 140. However, other suitable numbers of and/or combinations of levers may be utilized, as desired. For example, with reference to FIG. 1D, a lever-lock release system 100 may comprise an upper lever 120 and a lower lever 140. Moreover, in some exemplary embodiments where the payload is sufficiently light and/or the lever arm of lower lever 140 is sufficiently long, a lever-lock release system 100 may comprise only one lever, lower lever 140; in these exemplary embodiments, the top of lower lever 140 may be held in place prior to rotation, for example via locking loop 112. Stated another way, lever-lock release system 100 may be configured with two levers coupled to base 110, or even one lever coupled to base 110, rather than three. Moreover, with momentary reference to FIG. 4, depending on the space available, and the weight of a payload, lever-lock release system 100 may be configured with more than three levers, which may be of progressively larger/wider sizes (for example, five levers: a smallest upper lever 120, three intermediate levers 130, and a final, largest lower lever 140). Lever-lock release system 100 may comprise one lever up to about ten levers coupled to base 110, as needed.

Figure 1D:
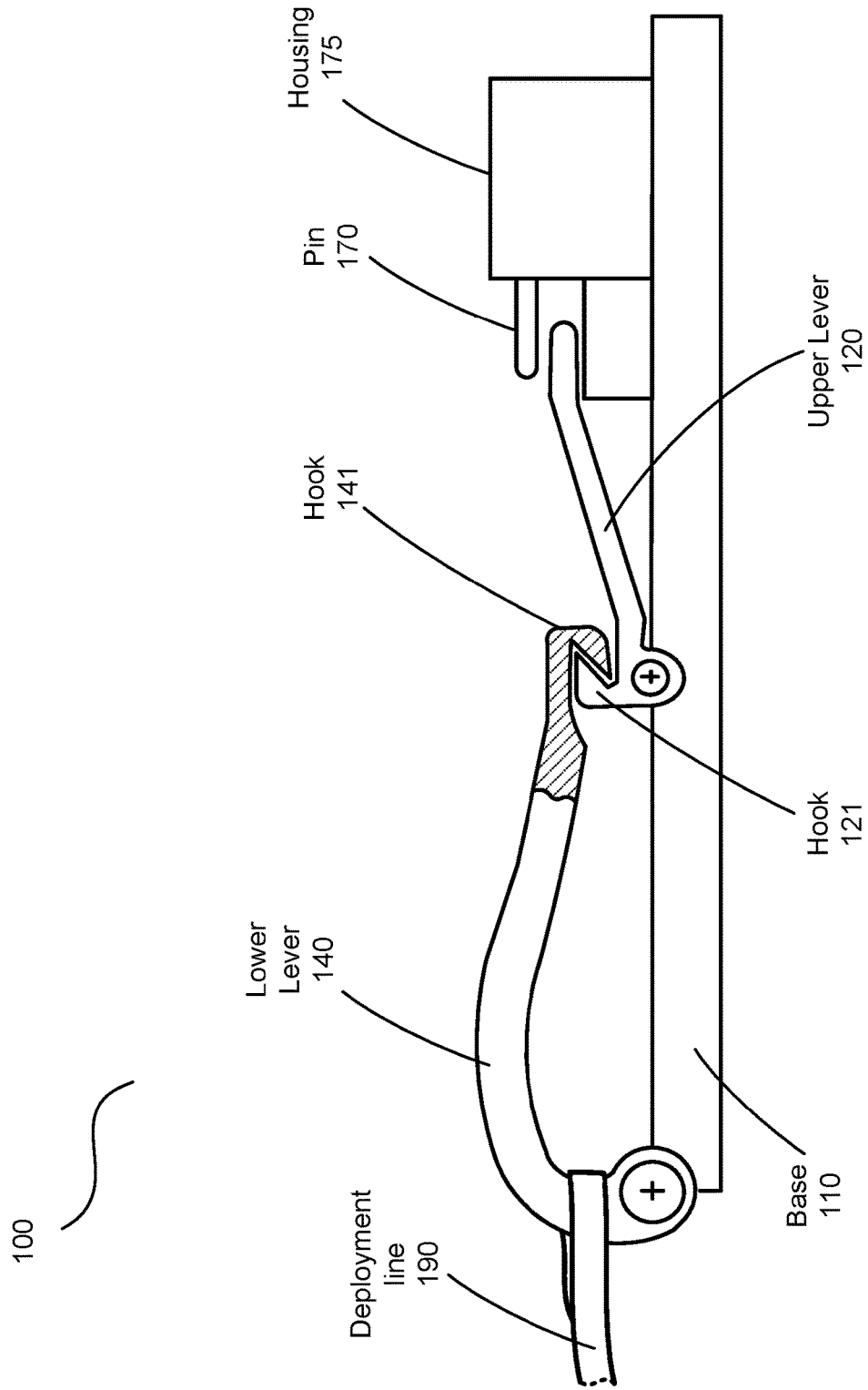
FIG. 1D illustrates components of a lever-lock release system in accordance with an exemplary embodiment.
Figure 1E:
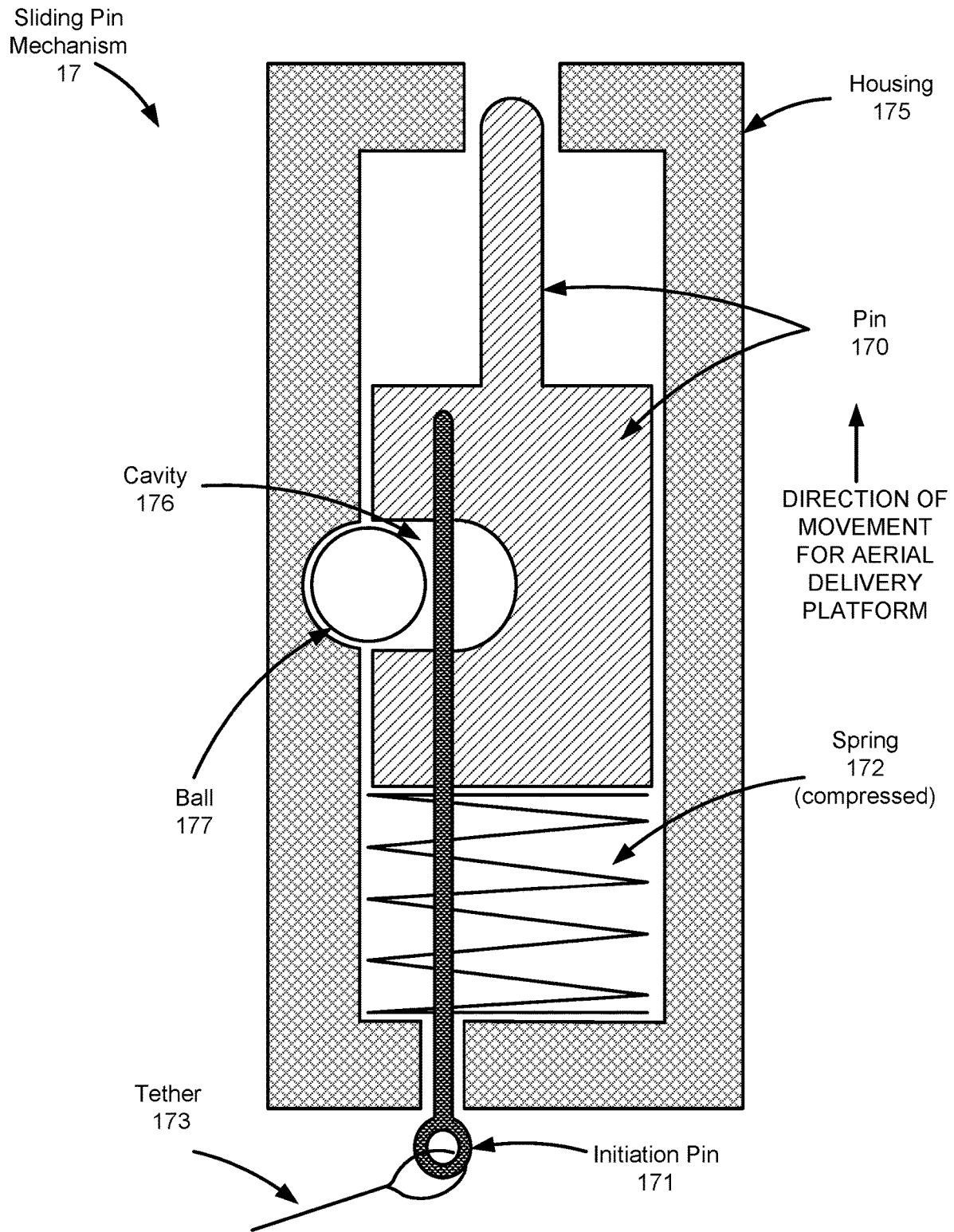
FIG. 1E illustrates a cut-away view of a decoupling device for use with a lever-lock release system in accordance with an exemplary embodiment.

With reference now to FIG. 1D and FIG. 1E, in various exemplary embodiments a sliding pin mechanism 17 may be utilized to govern operation of lever-lock release system 100. The sliding pin mechanism 17 may comprise a pin 170 disposed in a housing 175. FIG. 1E depicts how the primary pin 170 can be held in a cocked position until the tether 173 extracts the initiation pin 171 as the decoupling portion of the decoupling device moves toward the aft end of the aircraft. Slightly less than half of the steel ball 177 is seated in a cavity 176 in the housing 175 wall. The portion of cavity 176 in the primary pin 170 body is deeper than the diameter of the steel ball 177. However, the presence of initiation pin 171 forces ball 177 to remain lodged between the housing 175 wall and primary pin 170 body. As this assembly moves aft in the aircraft, initiation pin 171 will continue to keep ball 177 in place and, therefore, the primary pin 170 will stay in the cocked position. After some predetermined amount of travel, tether 173 will become taut and extract initiation pin 171 from the assembly. Provided that the force exerted by compressed spring 172 is sufficiently large, that pressure causes ball 177 to leave the portion of cavity 176 in the wall of housing 175 and move into the portion of cavity 176 within the primary pin 170. At this time the smaller diameter portion of the primary pin 170 will move out of housing 175 to lock the lever-lock release system 100, provided that there has been no premature decoupling event involving the extraction system. If there had been a premature decoupling event, initiation pin 171 would still be pulled, but by that time the recovery system deployment line would have been released from lower lever 140 of lever-lock release system 100.

Returning to FIG. 1D, it can be seen that, during aerial delivery of a platform, if pin 170 is initially held inside housing 175, a deployment line 190 may be installed on the J-shaped lower lever 140, and if a premature decoupling event occurred, the force exerted by deployment line 190 would cause lever-lock release system 100 to open up and release, as it is designed to do when pin 170 is retracted. If, however, pin 170 was retracted into housing 175, for example while rigging for an extraction event, and energy was stored by compressing a spring 172, when the stored energy was later unleashed, pin 170 would be pushed to a locked position, where it would therefore prevent lever-lock release system 100 from opening.

In various exemplary embodiments, base 110 is attached to the decoupling portion of the apparatus that connects the extraction system to the platform. In this configuration, when pin 170 is retracted and spring 172 is compressed, and the compressed spring 172 is temporarily locked in a compressed state, for example by initiation pin 171, and initiation pin 171 is anchored to the aircraft by a slack tether 173, the coupling/decoupling apparatus must travel some predetermined distance prior to tether 173 becoming taut. Tension on tether 173 extracts initiation pin 171 and allows the compressed spring 172 to push the primary pin 170 to the position where lever-lock release system 100 is in a locked position. If no premature decoupling event occurs, lever-lock release system 100 thus becomes locked closed prior to the platform exiting the aircraft. If, however, a premature decoupling event does occur, lever-lock release system 100 would flip open as the decoupling portion of the device moved aft, and away, from the main body of the coupling/decoupling apparatus due to drag from the deployment line 190. Then, when the compressed spring 172 is released, due to tension in the tether 173, lever-lock release system 100 would be in the open position but the recovery parachute system deployment line 190 would no longer be attached to the coupled portion of the apparatus and extraction system.

Because the rings of conventional ring release devices are generally intended to be attached to flexible webbing, it is necessary for the rings to pass one through another to ensure that they do not uncouple prematurely. In contrast, in lever-lock release systems utilizing a rigid base as disclosed herein, a ring-through-ring interface is not necessary to maintain a locked-closed position. Additionally, to allow a release event to occur, the levers of an exemplary lever-lock release system, such as lever-lock release system 100, do not need to rotate nearly as far as do the interlocked rings of prior ring release systems.

Additionally, in contrast to ring release devices where each successive ring must be small enough to pass through the ring that proceeded it, in exemplary lever-lock release systems as disclosed herein, all levers except the final lever may be identical regardless of the quantity of levers utilized.

With reference again to FIG. 1D, it will be appreciated that, if a tension force is applied to J-shaped lower lever 140 when pin 170 is extended, lower lever 140 will remain in the illustrated position. However, if pin 170 was retracted into housing 175, prior to that same tension force being applied to lower lever 140, levers 120/130/140 will rotate and release whatever was applying the tension, for example a recovery parachute deployment line 190.

It will be appreciated that an exemplary lever-lock release system, for example lever-lock release system 100, can be utilized in lieu of a ring release device; in such a configuration, lever-lock release system 100 would be initially locked. In other applications, lever-lock release system 100 can be utilized as a delayed locking component, and in such configuration, lever-lock release system 100 would be initially unlocked. These two applications may be selected, for example, dependent upon whether a primary pin retracting means is utilized (an initially locked system) or a primary pin extension means is utilized (an initially unlocked system).

Figure 2:
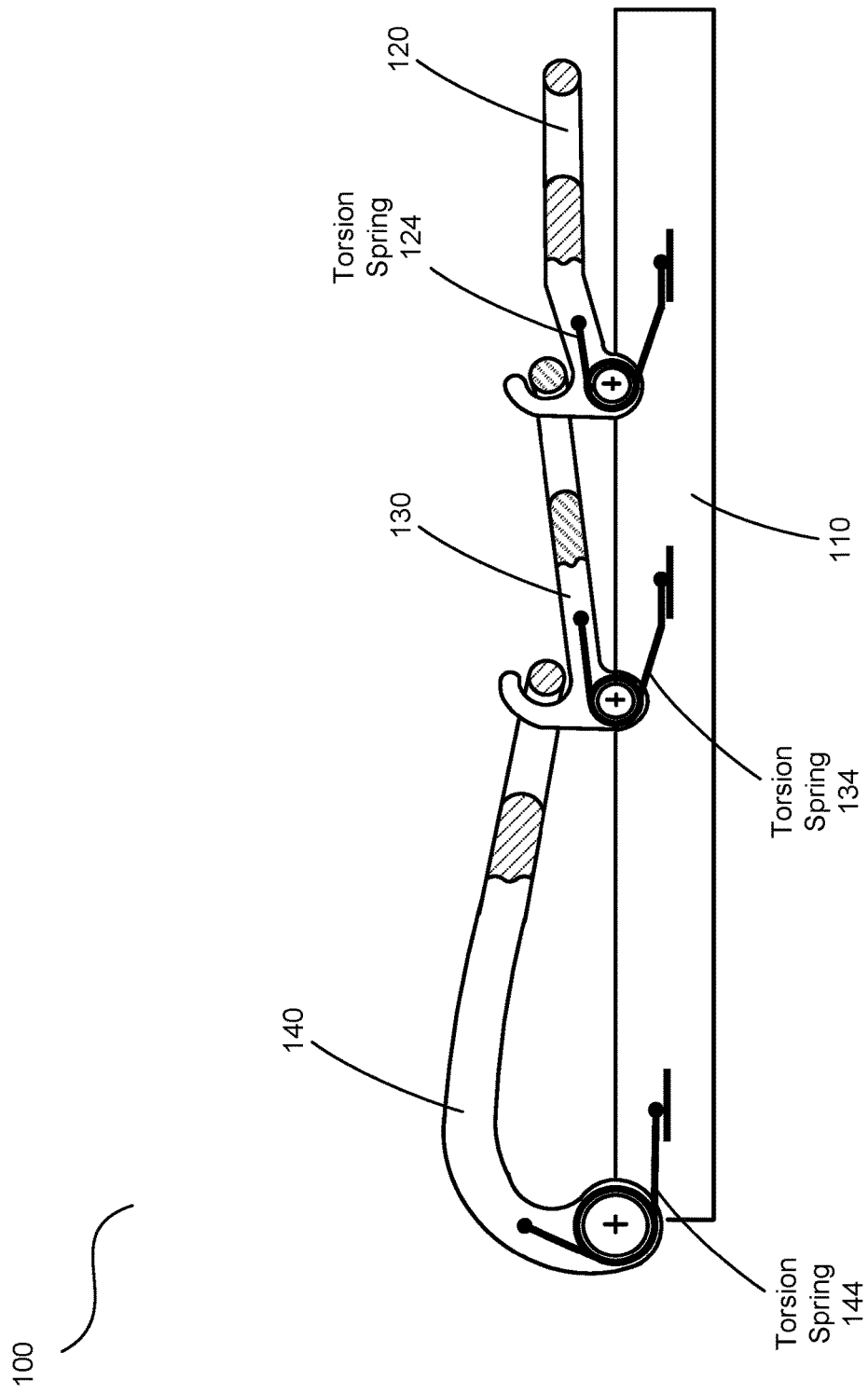
FIG. 2 illustrates components of a lever-lock release system utilizing torsion springs in accordance with various exemplary embodiments.

With reference now to FIG. 2, in some exemplary embodiments lever-lock release system 100 may be configured with components that urge rotation of levers 120, 130, and/or 140, for example rotation into an opened configuration. For example, levers 120, 130, and 140 may each be paired with a respective torsion spring 124, 134, 144, each spring disposed about a respective pivot hole 122, 132, 142. The torsion springs 124, 134, 144 apply a rotational force to levers 120, 130, and 140 to cause more rapid rotation of levers 120, 130, and 140 responsive to release of upper lever 120.

Figure 3:
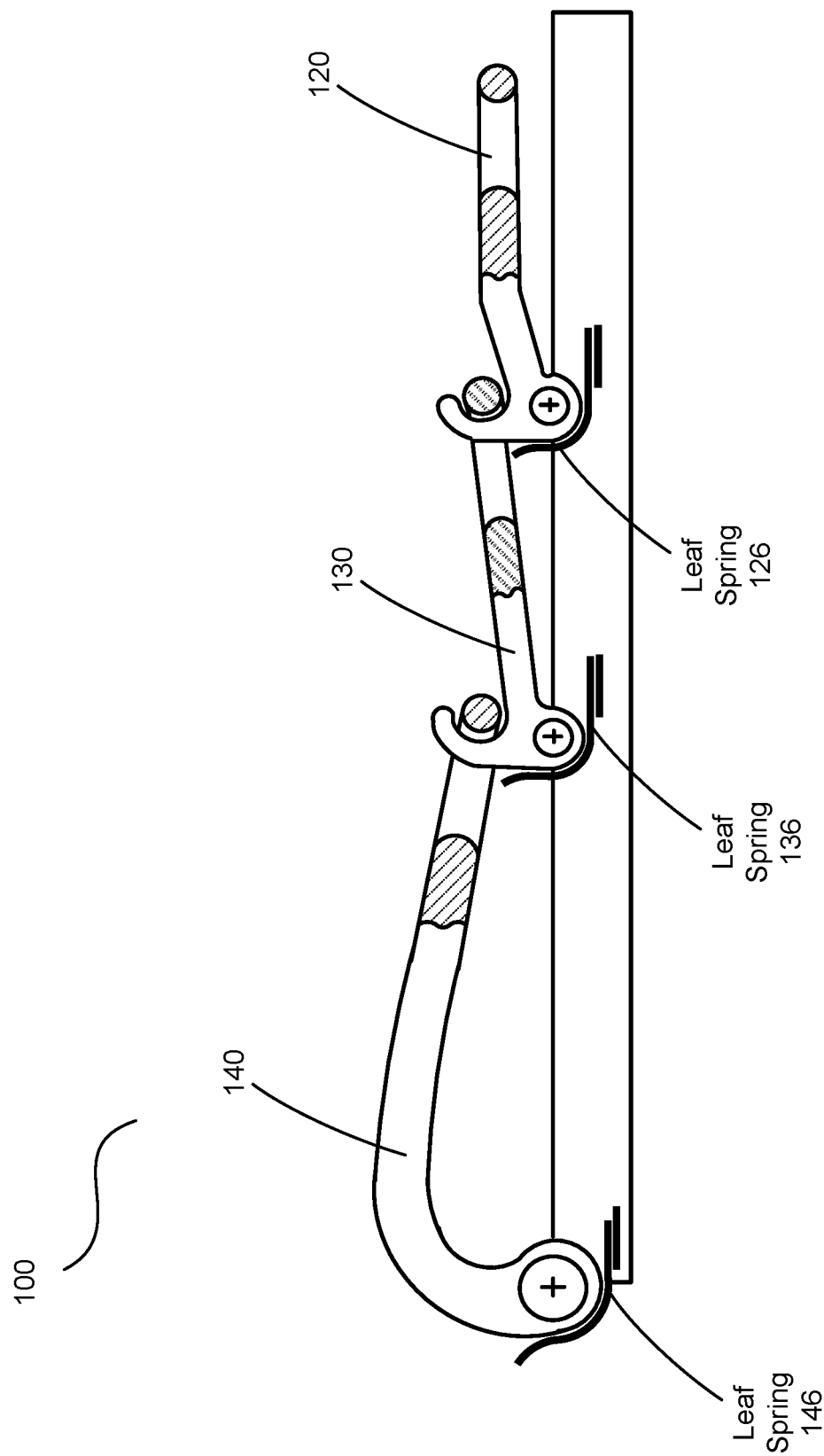
FIG. 3 illustrates components of a lever-lock release system utilizing leaf springs in accordance with various exemplary embodiments.

Turning now to FIG. 3, in various exemplary embodiments lever-lock release system 100 is configured with components that urge rotation of levers 120, 130, and/or 140 into a closed position and/or that retain levers 120, 130 and/or 140 in a closed position until a sufficiently large force is applied. For example, levers 120, 130, and 140 may each be paired with a respective leaf spring 126, 136, 146, each spring disposed at least partially about a respective pivot hole 122, 132, 142. The leaf springs apply a rotational force to levers 120, 130, and 140, for example to retain levers 120, 130, and 140 in a closed position until an applied force is sufficient to cause rotation of upper lever 120. In this manner, levers 120, 130, and 140 may be prevented from prematurely disengaging with one another, for example in response to vibrations or turbulence that may occur when lever-lock release system 100 is in an unlocked configuration.

Figure 5A:
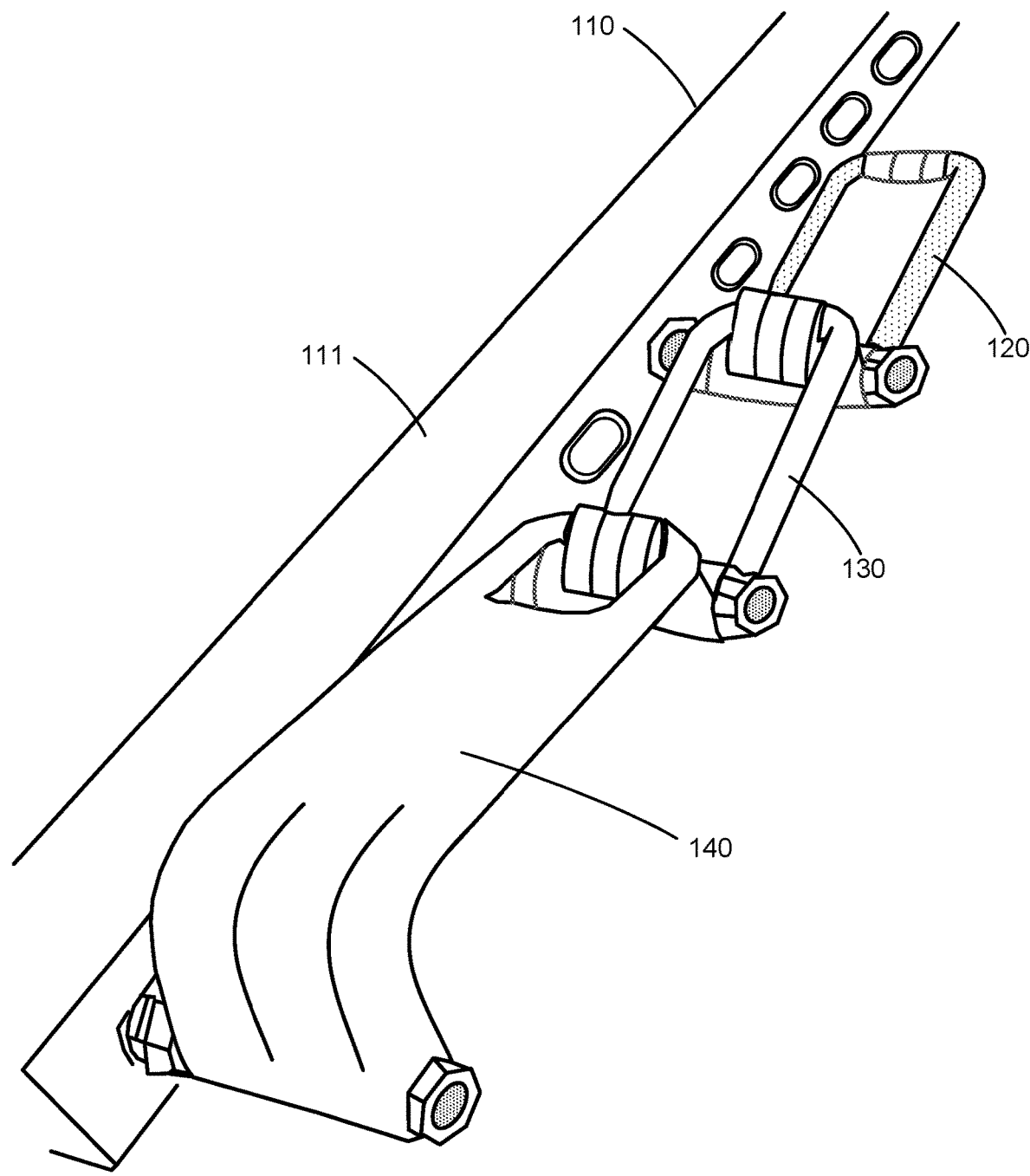
FIG. 5A illustrates levers of an exemplary lever-lock release system in a retained configuration in accordance with various exemplary embodiments.
Figure 5B:
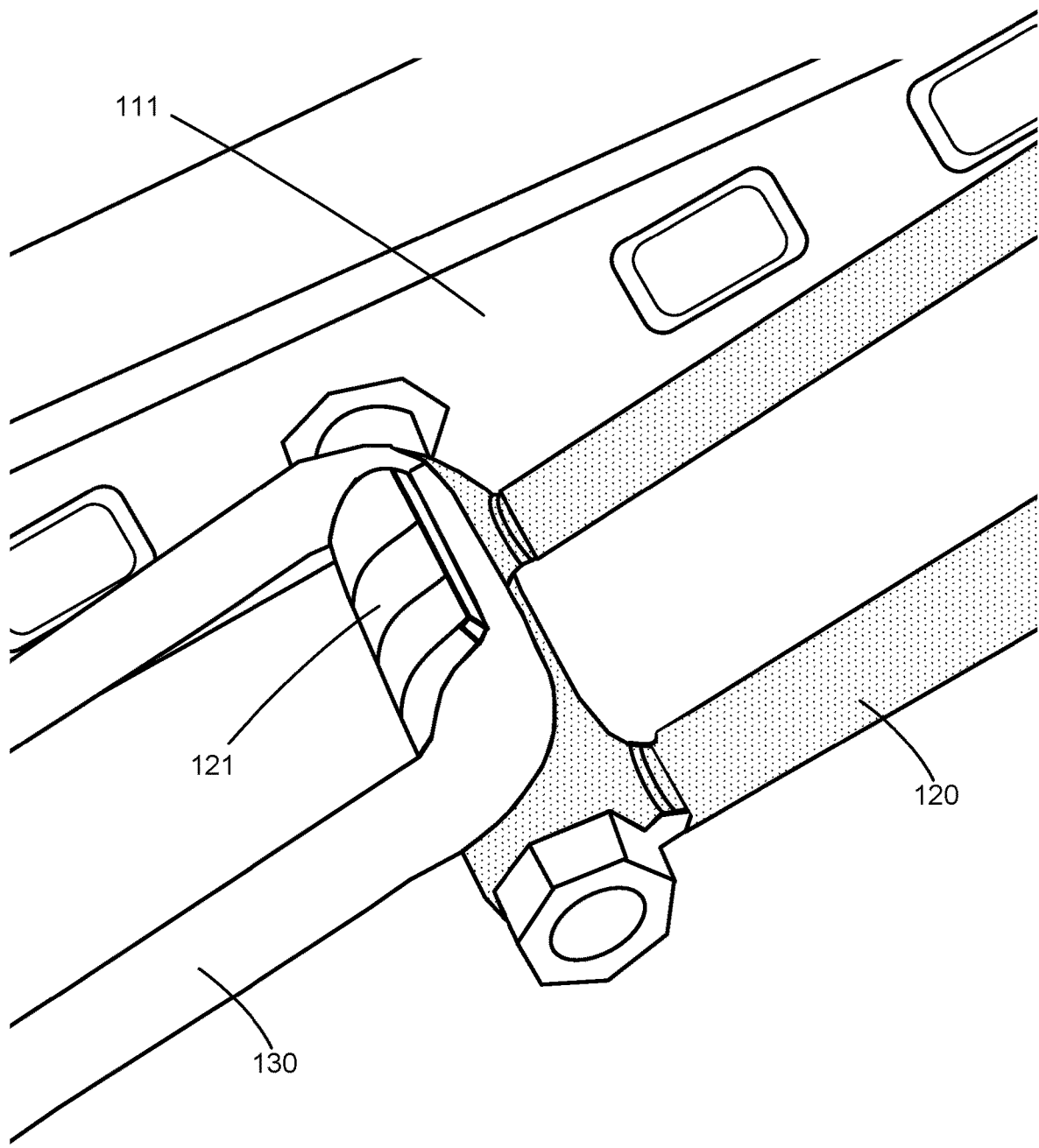
FIG. 5B illustrates a first lever of an exemplary lever-lock release system retaining a second lever in a locked position in accordance with various exemplary embodiments.
Figure 5C:
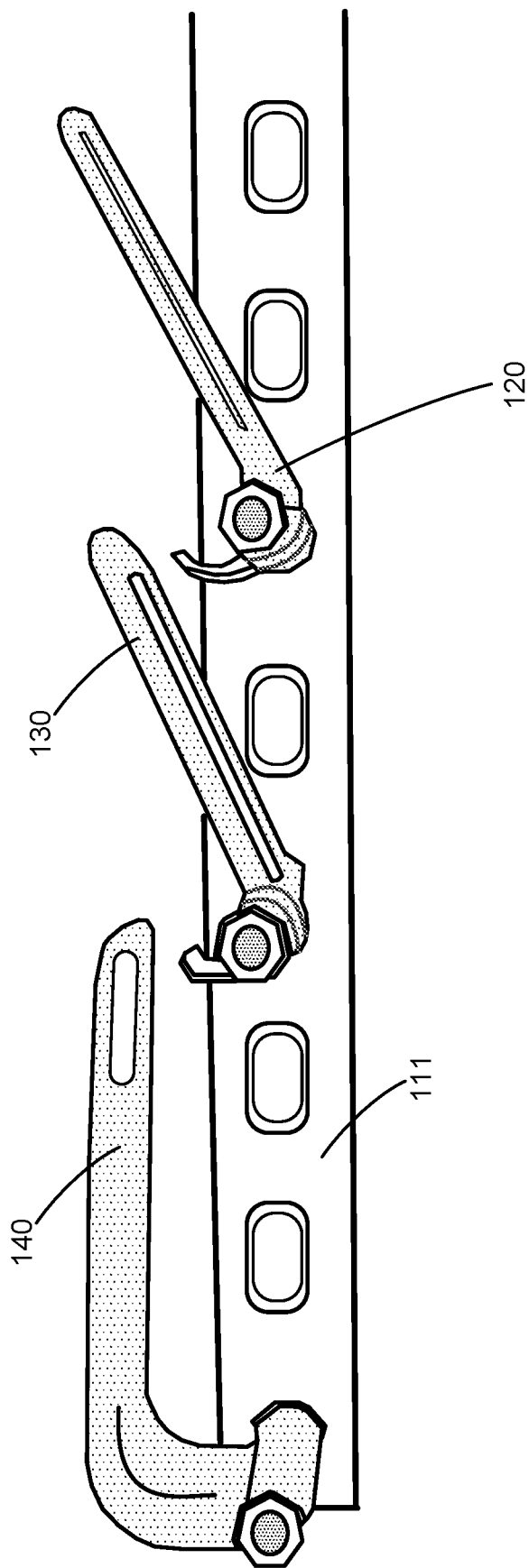
FIG. 5C illustrates components of an exemplary lever-lock release system in an unlocked or released position in accordance with various exemplary embodiments.

With reference now to FIGS. 5A, 5B, and 5C, in some exemplary embodiments base 110 may comprise a planar section of material. In other exemplary embodiments, base 110 may comprise a rail or rails 111, for example a rail 111 disposed on either side of the levers comprising lever-lock release system 100. In these configurations, rails 111 provide mounting points for the bolts about which the corresponding levers are rotatable. Additionally, rails 111 may provide structural support for base 110 and/or mounting points whereby lever-lock release system 100 may be coupled to other components, for example other components of an aerial delivery system.

Figure 6A:
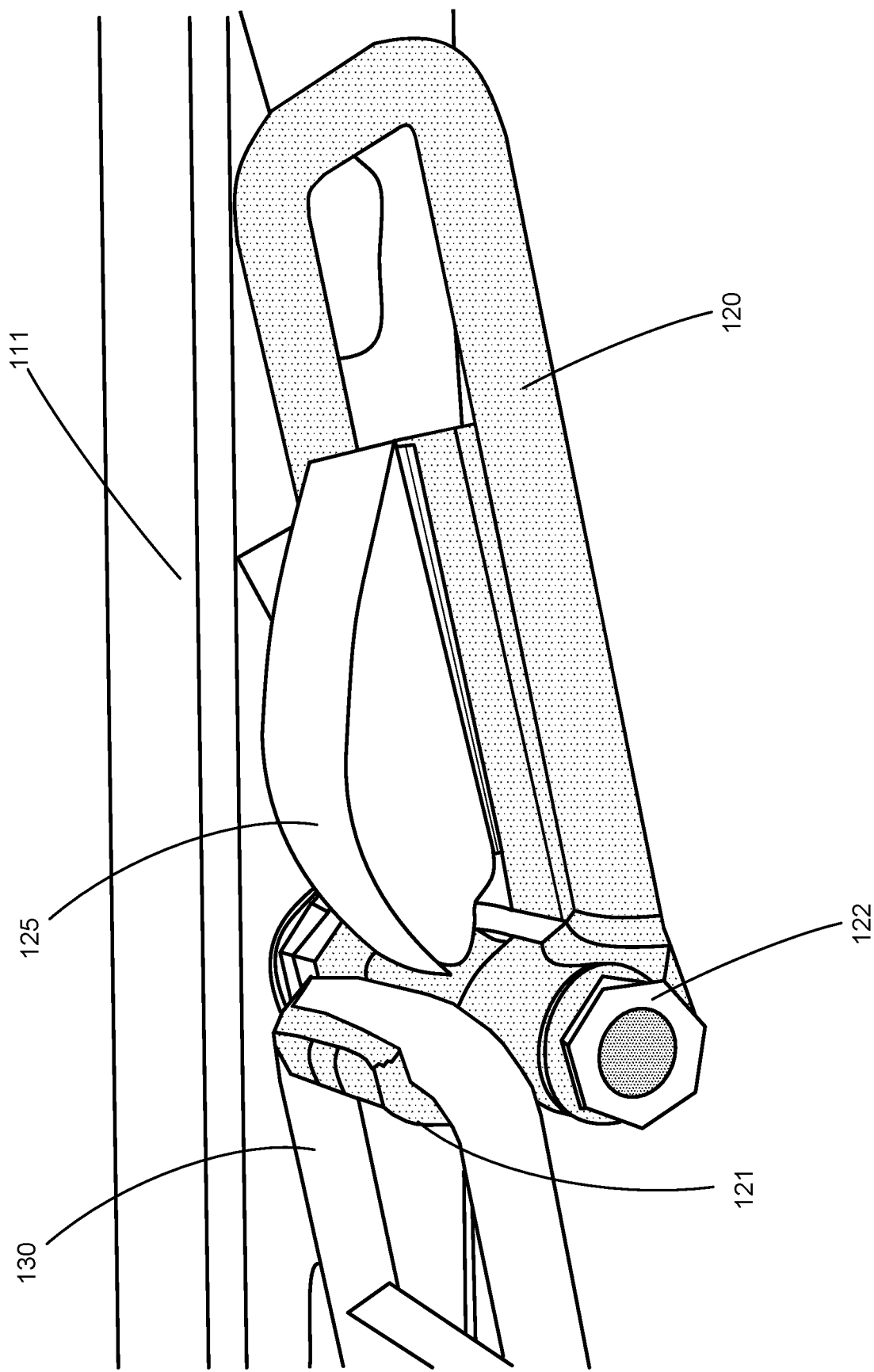
FIG. 6A illustrates components of an exemplary lever-lock release system having a cam element, in a locked position, in accordance with various exemplary embodiments.

With reference now to FIGS. 6A through 6E, in various exemplary embodiments upper lever 120 and/or intermediate lever 130 (and more generally, any lever except the final lever) may be configured with a cam portion. The cam portion is operative to provide a force to the next lever in the chain to urge rotation/separation of the next lever. In one exemplary embodiment, upper lever 120 is configured with upper cam 125. In some exemplary embodiments, upper cam 125 is disposed generally in the middle of upper lever 120, as illustrated in FIG. 6A. In other exemplary embodiments, upper cam 125 may be formed from the side rails of upper lever 120; stated another way, upper lever 120 may be configured with a curved, "bulging", and/or roughly "J" shape when viewed from the side. In yet other exemplary embodiments, the entire profile of upper lever 120 may be configured with a curve effective to function as upper cam 125 (for example, as illustrated in FIG. 6E). Upper cam 125 may be monolithically formed with other components of upper lever 120. Alternatively, upper cam 125 may be formed from a durable material and coupled and/or bonded to other components of upper lever 120.

Figure 6B:
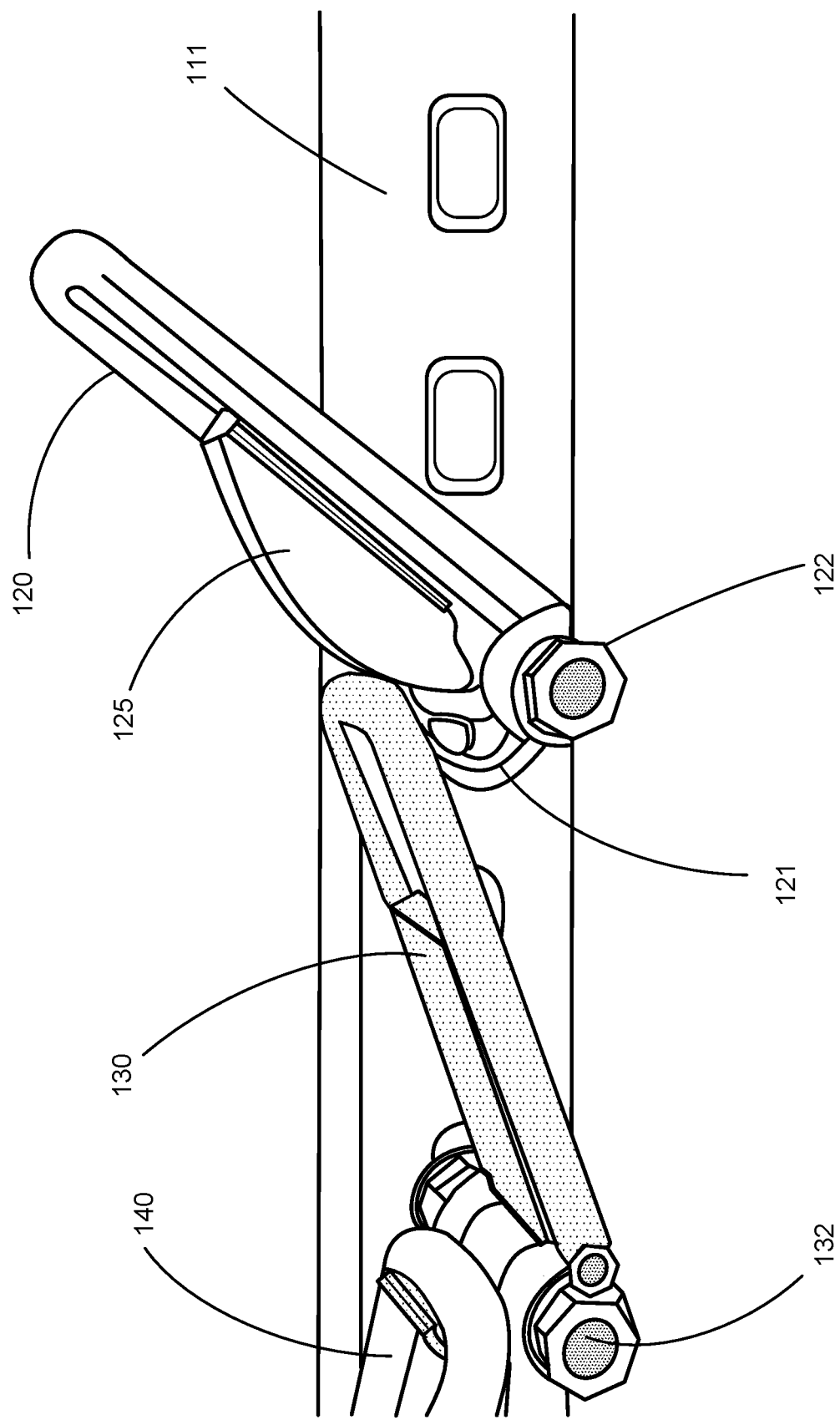
FIG. 6B illustrates components of an exemplary lever-lock release system having a cam element, with the cam element providing a force toward an unlocked position, in accordance with various exemplary embodiments.

With reference now to FIG. 6B, as upper lever 120 is rotated, intermediate lever 130 is released from hook 121. Additionally, upper cam 125 comes into contact with intermediate lever 130, thus transferring a portion of the rotational force moving upper lever 120 into corresponding rotational movement of intermediate lever 130. It will be appreciated that the angles of curvature of upper cam 125, the length of upper lever 120, the length of intermediate lever 130, and the coefficient of friction between upper cam 125 and intermediate lever 130 may be adjusted to achieve a desired level of force on intermediate lever 130 responsive to a particular applied force or operational environment for upper lever 120.

Figure 6C:
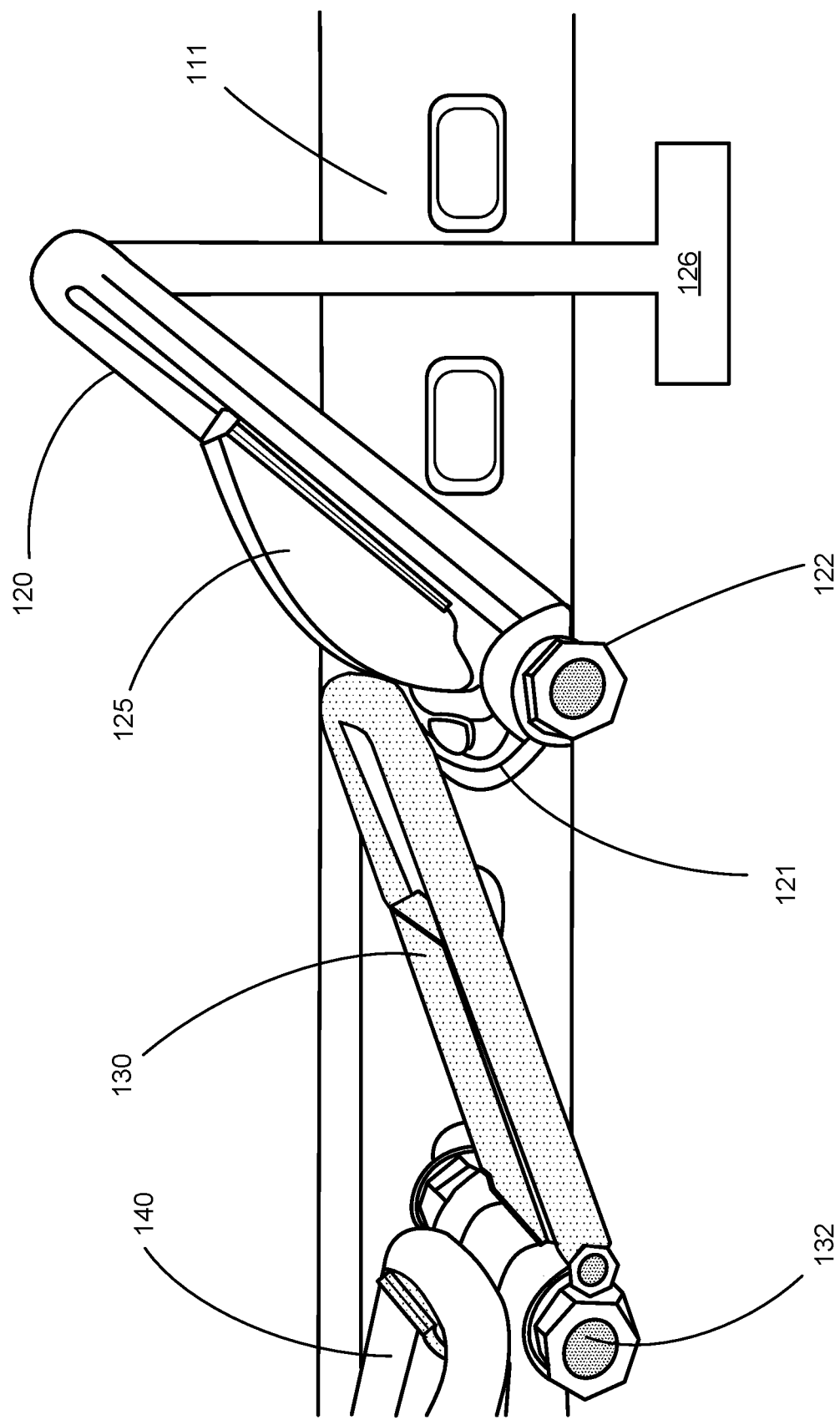
FIG. 6C illustrates components of an exemplary lever-lock release system having a cam element and an extension element, in accordance with various exemplary embodiments.

Moreover, with reference now to FIG. 6C, in various exemplary embodiments lever-lock release system 100 is configured with an extension element 126. Extension element 126 is operative to lift/push the top of upper lever 120 generally in its "releasing" rotational direction, thus eventually releasing intermediate lever 130 and lower lever 140. Extension element 126 may also be configured to retrieve/pull the top of upper lever 120 generally in its "locking" rotational direction, thus placing upper lever 120, intermediate lever 130, and lower lever 140 into a locked position. In some exemplary embodiments, extension element 126 comprises a stored energy spring. In other exemplary elements, extension element 126 comprises a hydraulic ram. In yet other exemplary embodiments, extension element 126 comprises a column extendable and retrievable via operation of a linear motor. Moreover, extension element 126 may comprise any suitable components or combination of components configured to controllably cause upper lever 120 to rotate in a releasing and/or locking direction.

With reference to FIG. 6D, in various exemplary embodiments, upper cam 125 may be configured with a profile that results in a desired amount of force transferred to intermediate lever 130 as upper lever 120 rotates. In one embodiment, upper cam 125 may be configured with a lower degree of curvature and/or extension beyond the main body of the lever arm portion of upper lever 120. In another embodiment, upper cam 125 may be configured with a higher degree of curvature and/or extension beyond the main body of the lever arm portion of upper lever 120; in this embodiment, upper cam 125 applies a relatively higher amount of force to intermediate lever 130. The dimensions and curvature of upper cam 125 may be adjusted, as desired, in order to achieve a particular force transfer function.

Figure 8A:
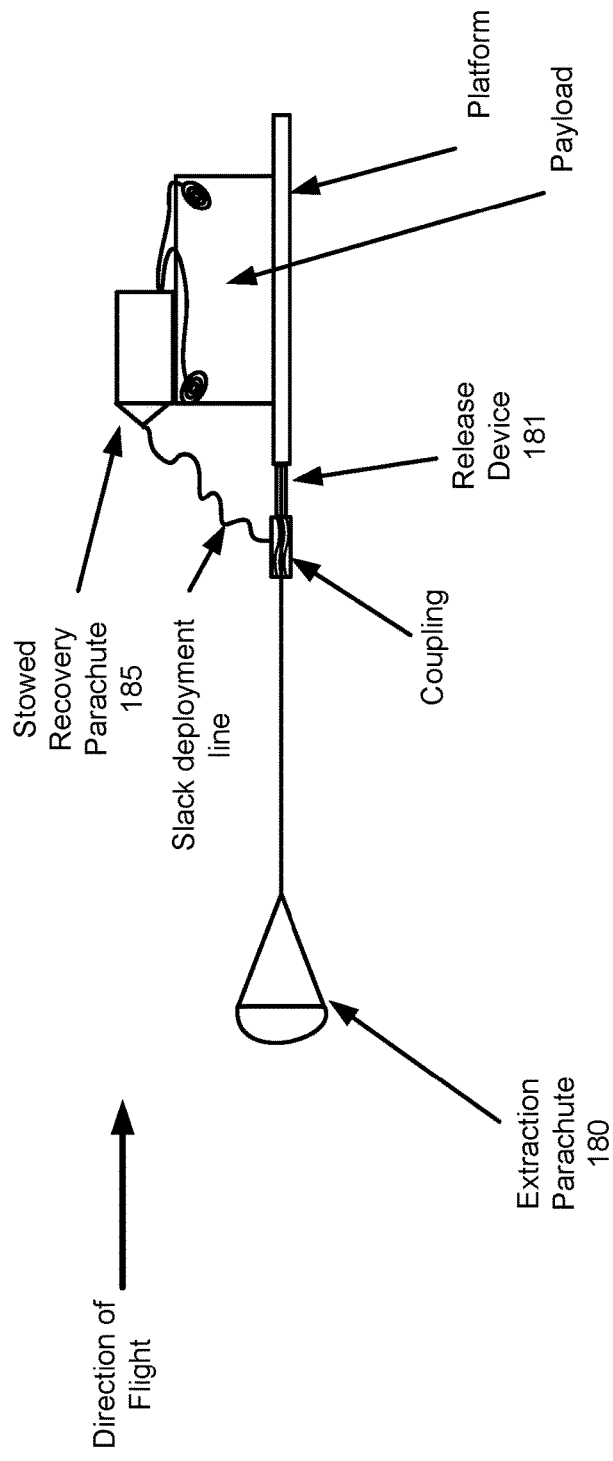
FIGS. 8A, 8B, and 8C illustrate a failure mode for aerial delivery when an exemplary lever-lock release system is not utilized.

Turning now to FIGS. 8A, 8B, 8C, and 8D, in various exemplary embodiments lever-lock release system 100 is operable in connection with deployment of a payload from an aircraft. FIG. 8A depicts, in generalized form, an aerial delivery system at the moment where extraction parachute 180 has deployed, but prior to extraction parachute 180 exerting enough drag force to significantly load anything forward of extraction parachute 180. The recovery parachute 185 is stowed with the payload, and is coupled to the four corners of the platform (or payload) via slings in a conventional manner.

Figure 8B:
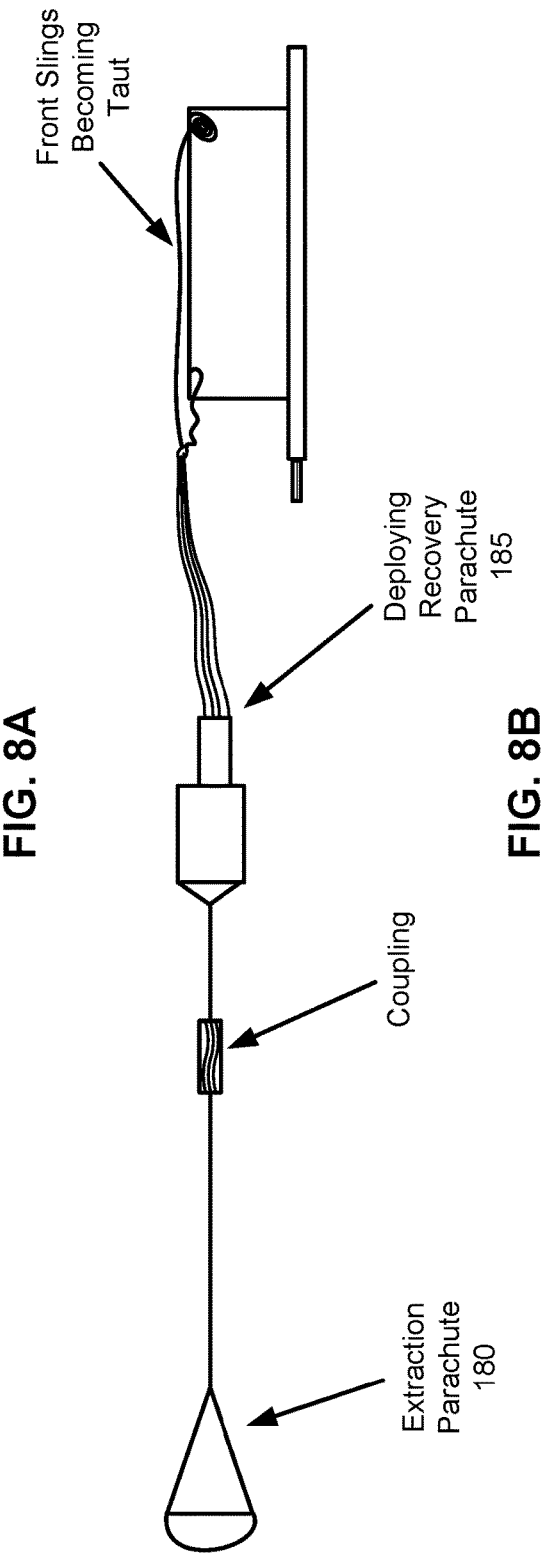

FIG. 8B illustrates the next event to occur if a release device 181 for the recovery parachute 185 activates prematurely. The drag exerted by extraction parachute 180 is transferred to recovery parachute 185, deploying recovery parachute 185 from the rear of the aircraft.

Figure 8C:
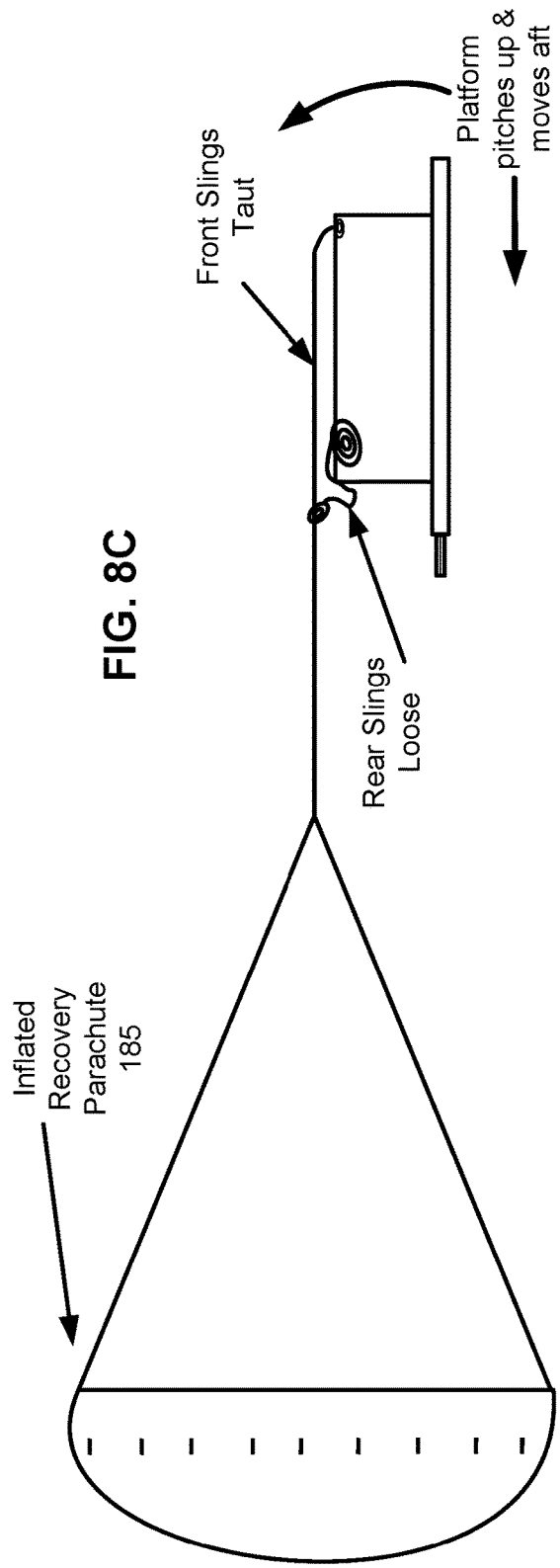

FIG. 8C illustrates the next event to occur in this undesirable chain; recovery parachute 185 has inflated while the platform and payload remain within the aircraft. The drag force from recovery parachute 185 is directed to the front suspension slings while the rear suspension slings remain slack. With the front suspension slings fully loaded, the platform (and coupled payload) tend to move aft but, at the same time, the front of the platform and payload tend to pitch upward. During this time, recovery parachute 185 is inflated generally directly behind the aircraft, potentially causing significant disruption to aircraft stability, and typically destroying or heavily damaging recovery parachute 185.

Figure 8D:
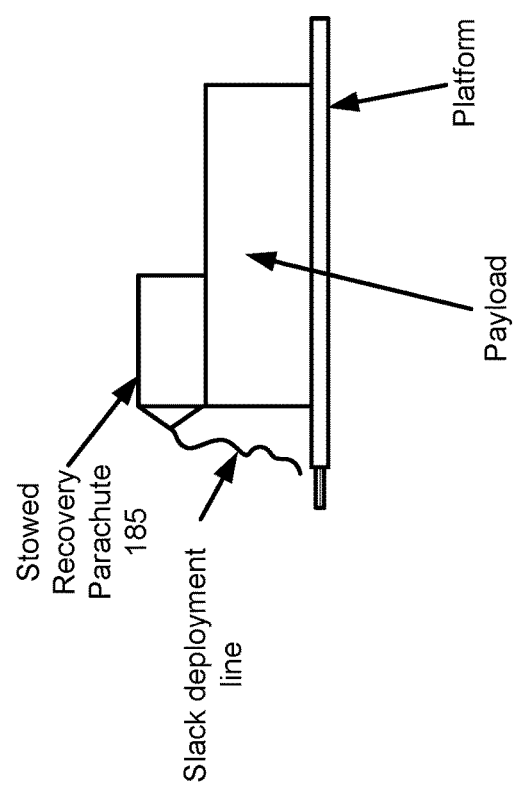
FIG. 8D illustrates operation of an exemplary lever-lock release system in connection with aerial delivery in accordance with various exemplary embodiments.
Figure 8D:
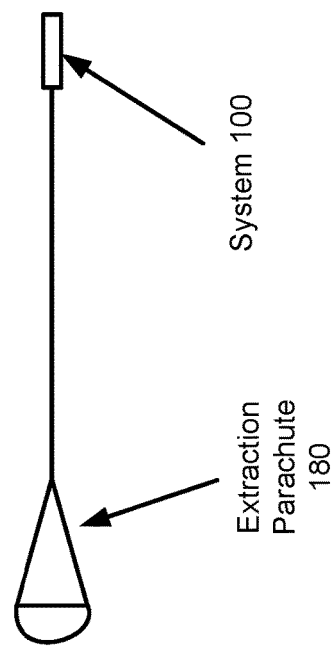

To prevent the unpleasant scenario depicted in FIGS. 8A through 8C from occurring, lever-lock release system 100 may be deployed in place of the coupling depicted in FIGS. 8A through 8C. In this application, lever-lock release system 100 is configured in an initially unlocked/unlatched configuration, and is not locked/latched until the associated platform and payload have moved aft in the aircraft some predetermined amount responsive to the force exerted by extraction parachute 180. If release device 181 releases prematurely, lever-lock release system 100 is in the unlocked/unlatched configuration when force is applied, and thus extraction parachute 180 separates both: (i) from the platform and payload; and (ii) from the deployment line of recovery parachute 185, for example as depicted in FIG. 8D.

It will be appreciated that lever-lock release system 100 may also be utilized after a payload has landed on the ground, for example to separate multiple parachutes from a payload. When multiple parachutes are utilized for one payload, they are typically equipped with a mechanism that will release them from the payload after landing to prevent the payload from being dragged by winds and an inflated parachute. If the parachutes are not released individually, however, one of them might stay inflated, which will then drag any others across the terrain. In such a dragging process, it has been demonstrated many times that all the parachutes involved will be significantly damaged. To avoid the payload dragging potential, and to decouple one parachute from another, in prior approaches a landing sensor within a parachute releasing device will cause the parachutes to be released individually. However, in these prior approaches the apex of the payload slings remain attached to the main body of the parachute release device (where the landing sensor device is housed), and may at least partially trap the payload within the slings; it will be appreciated that this can be undesirable, particularly if the payload is a vehicle and the goal is to drive it away quickly after the parachute landing.

In contrast, in various exemplary embodiments each parachute may be secured to payload slings via a lever-lock release system 100 (alternatively, multiple parachutes may be secured to payload slings via a lever-lock release system 100). Responsive to operation of lever-lock release system 100, each payload sling is separated, and no coupling between payload slings remains. Thus, drive-away of the payload is made more convenient.

Figure 9:
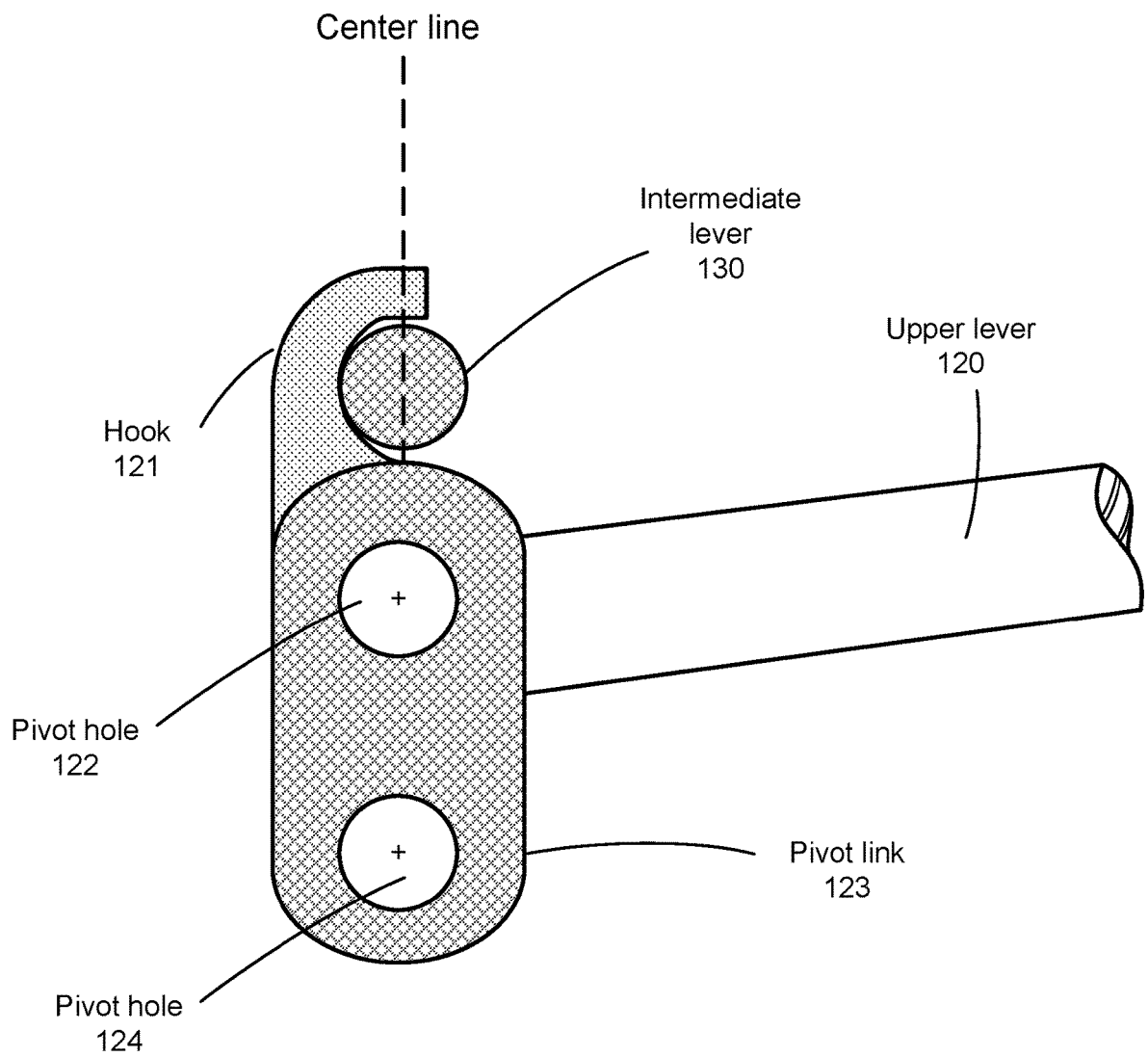
FIG. 9 illustrates use of a pivot link in an exemplary lever-lock release system in accordance with various exemplary embodiments.

With reference now to FIG. 9, in various exemplary embodiments, components of lever-lock release system 100, for example upper lever 120, intermediate lever 130, and/or lower lever 140, may be configured with a pivot link whereby the lever may be provided with at least one additional degree of freedom. In some exemplary embodiments, upper lever 120 is rotatably coupled to a pivot link 123 via pivot hole 122. Pivot link 123 is likewise rotatably coupled to base 110 via another pivot hole 124. The rotation of upper lever 120 with respect to pivot link 123 may be independent of rotation of pivot link 123 with respect to base 110, and vice versa. An effective length of the linkage arm formed by pivot link 123 (e.g., the distance between the center of pivot hole 122 and the center of pivot hole 124) may be selected as desired based at least in part on an intended application for lever-lock release system 100, for example an associated payload mass, a deceleration arising from use of a particular drogue and/or primary parachute, and/or the like. Pivot link 123 may be formed of any suitable durable material, for example aluminum, steel, titanium, plastic, or the like. In various exemplary embodiments, two pivot links 123 are coupled to upper lever 120 (e.g., one on each side of upper lever 120, to provide rotational support and/or guidance to upper lever 120). However, any suitable number of pivot links 123 may be utilized in connection with a lever of lever-lock release system 100, as desired.

Turning now to FIGS. 10A through 10E, in various exemplary embodiments a lever-lock release system 100 may be configured with one or more sliding elements operable to engage and/or disengage from one another in order to secure or release an associated object, such as a payload, a deployment line, and/or the like.

In these exemplary embodiments, base 110 may be configured with various grooves, trenches, and/or holes. For example, with reference to FIGS. 10A and 10B, base 110 may be configured with a pair of grooves 113, such as dovetail grooves, disposed one on each side of base 110. Other components of lever-lock release system 100, such as upper lever 120, intermediate lever 130, and/or lower lever 140, may be configured with corresponding protrusions. For example, upper lever 120 may be configured with protrusions 127 that fit at least partially into grooves 113 such that upper lever 120 is slidable along grooves 113 and thus moveable with respect to base 110.

Figure 10A:
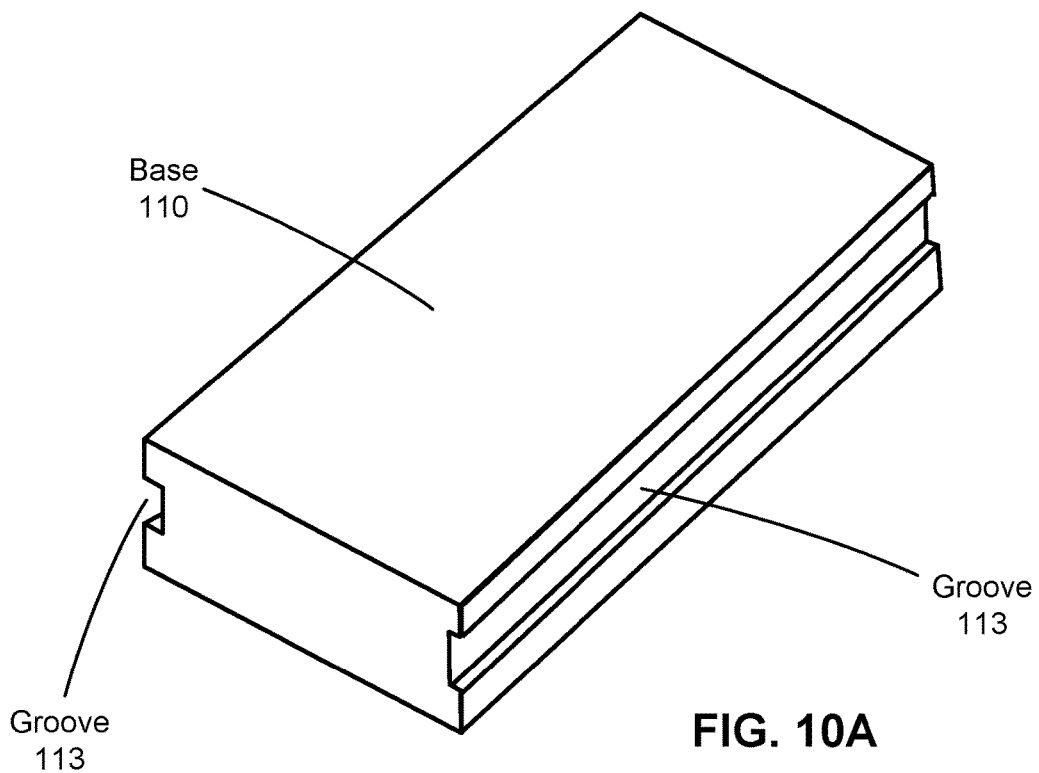
FIG. 10A illustrates a base component configured for interfacing with slidable components of an exemplary lever-lock release system in accordance with various exemplary embodiments.
Figure 10B:
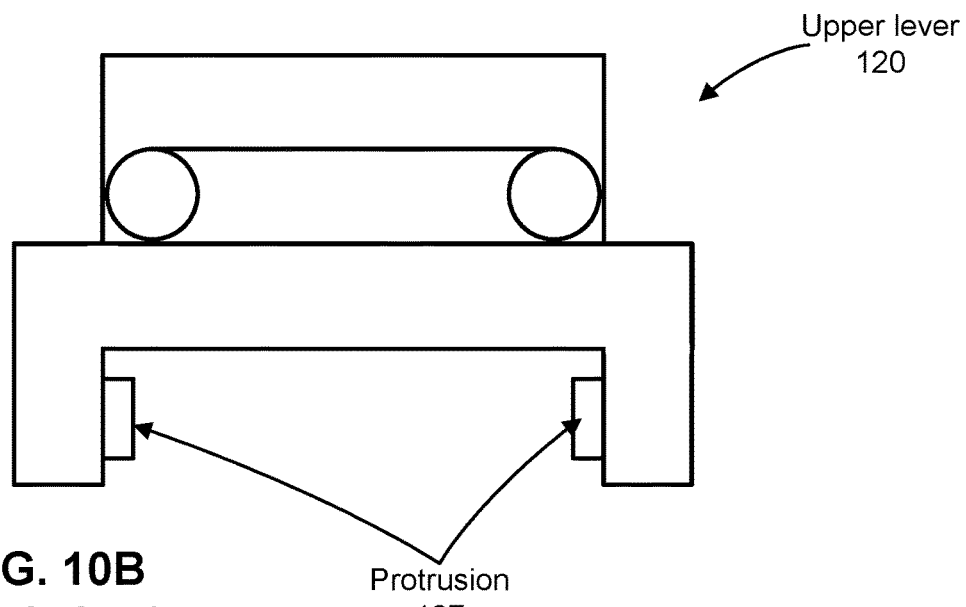
FIG. 10B illustrates an end view of a slidable component (upper lever) of an exemplary lever-lock release system in accordance with various exemplary embodiments.
Figure 10C:
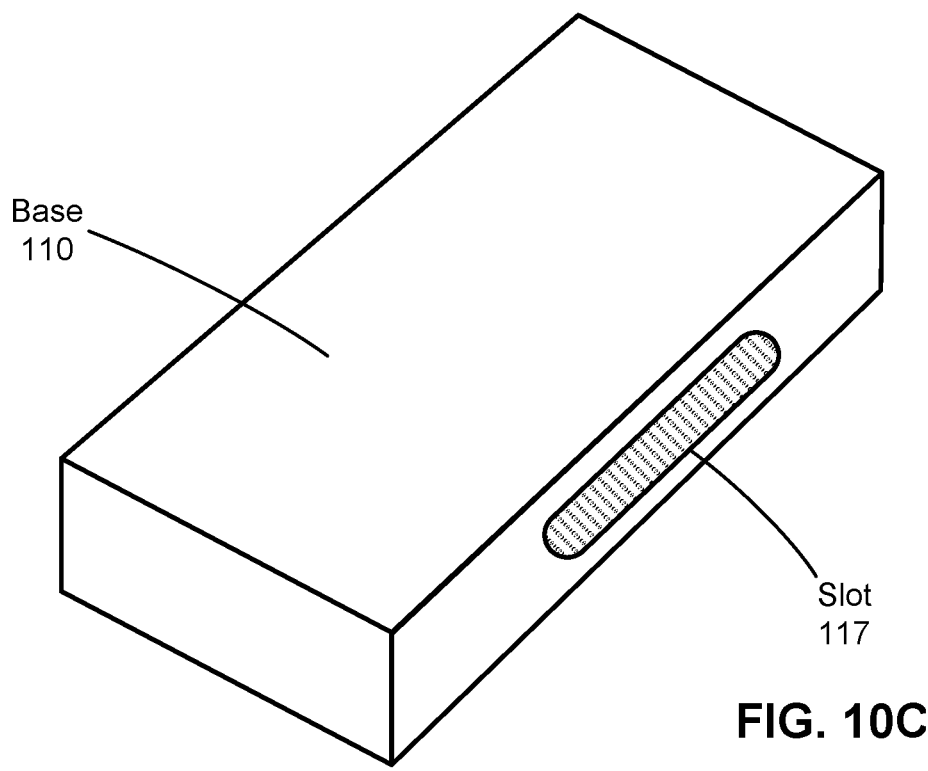
FIG. 10C illustrates a base component configured for interfacing with slidable components of an exemplary lever-lock release system in accordance with various exemplary embodiments.
Figure 10D:
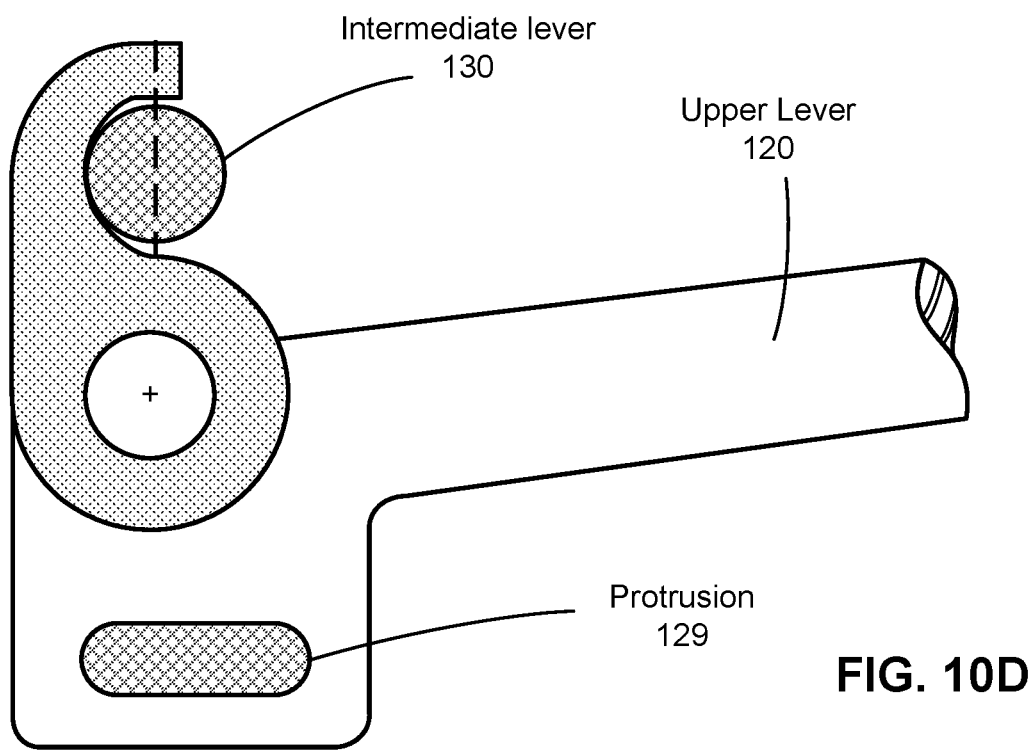
FIG. 10D illustrates a side view of a slidable component (upper lever) of an exemplary lever-lock release system in accordance with various exemplary embodiments.
Figure 10E:
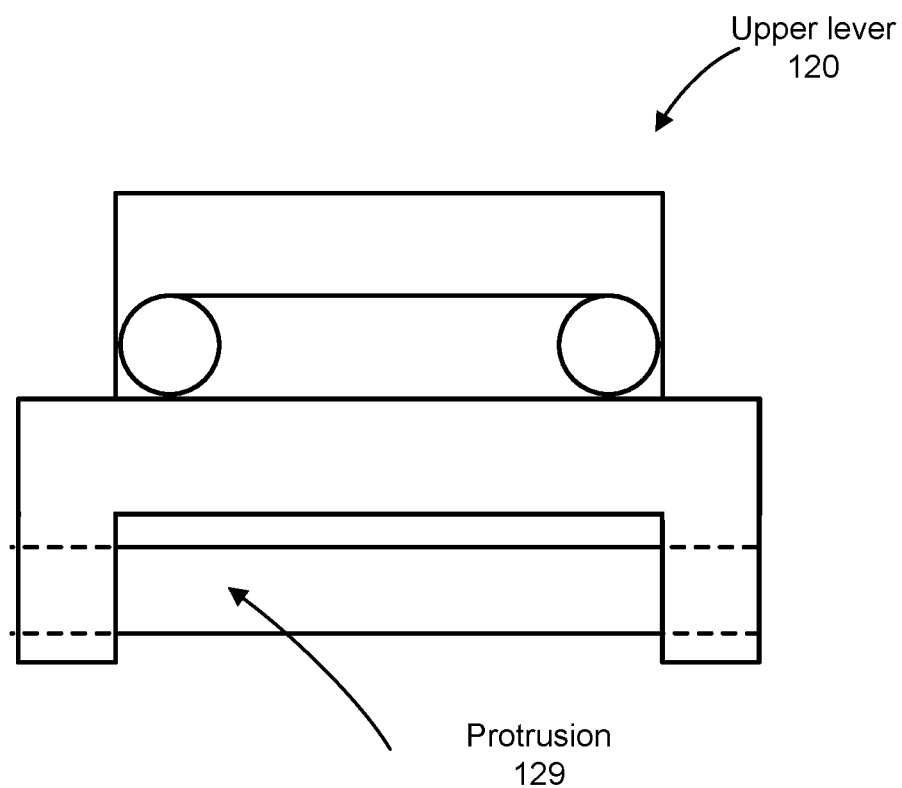
FIG. 10E illustrates an end view of a slidable component (upper lever) of an exemplary lever-lock release system in accordance with various exemplary embodiments.

Moreover, in some exemplary embodiments and with reference now to FIGS. 10C, 10D, and 10E, base 110 may be configured with various holes, such as one or more elongated slots 117, such that other components of lever-lock release system 100, such as upper lever 120, intermediate lever 130, and/or lower lever 140, may be slid (e.g., along a portion of the length of base 110, and/or "sideways" along a portion of the width of base 110) in order to engage and/or disengage from other components of lever-lock release system 100. For example, in one exemplary embodiment base 110 is configured with a slot 117 associated with an upper lever 120. Upper lever 120 is configured with a hole therethrough such that it is couplable to base 110 via a protrusion 129 passing through slot 117 and securable to upper lever 120 on both sides of base 110. In some exemplary embodiments, protrusion 129 may be oblong and may roughly correspond with (and be slightly smaller than) the inner dimensions of slot 117. In these exemplary embodiments, upper lever 120 may thus slide some limited distance along base 110 depending on the size of slot 117. However, due to the oblong shape of protrusion 129, in these exemplary embodiments upper lever 120 may not be rotatable with respect to base 110 (as rotation is prevented due to the interaction between the protrusion 129 and slot 117), but rather may be slid at least partially along the length of base 110.

Continuing to reference FIGS. 10C, 10D, and 10E, in some exemplary embodiments protrusion 129 passing through slot 117 may be generally circular (or otherwise have a longest cross-sectional dimension not exceeding the smallest interior dimension of elongated slot 117). In these exemplary embodiments, upper lever 120 may be both rotatable with respect to base 110 (as protrusion 129 is rotatable within slot 117) and slidable with respect to base 110 (as protrusion 129 is moveable along the length of slot 117). Thus, for example, with reference to FIG. 10D, upper lever 120 may slide to the "left" as depicted in that figure in order to unlock/disengage from intermediate lever 130, and slide to the "right" in order to reengage/relock intermediate lever 130.

Figure 11A:
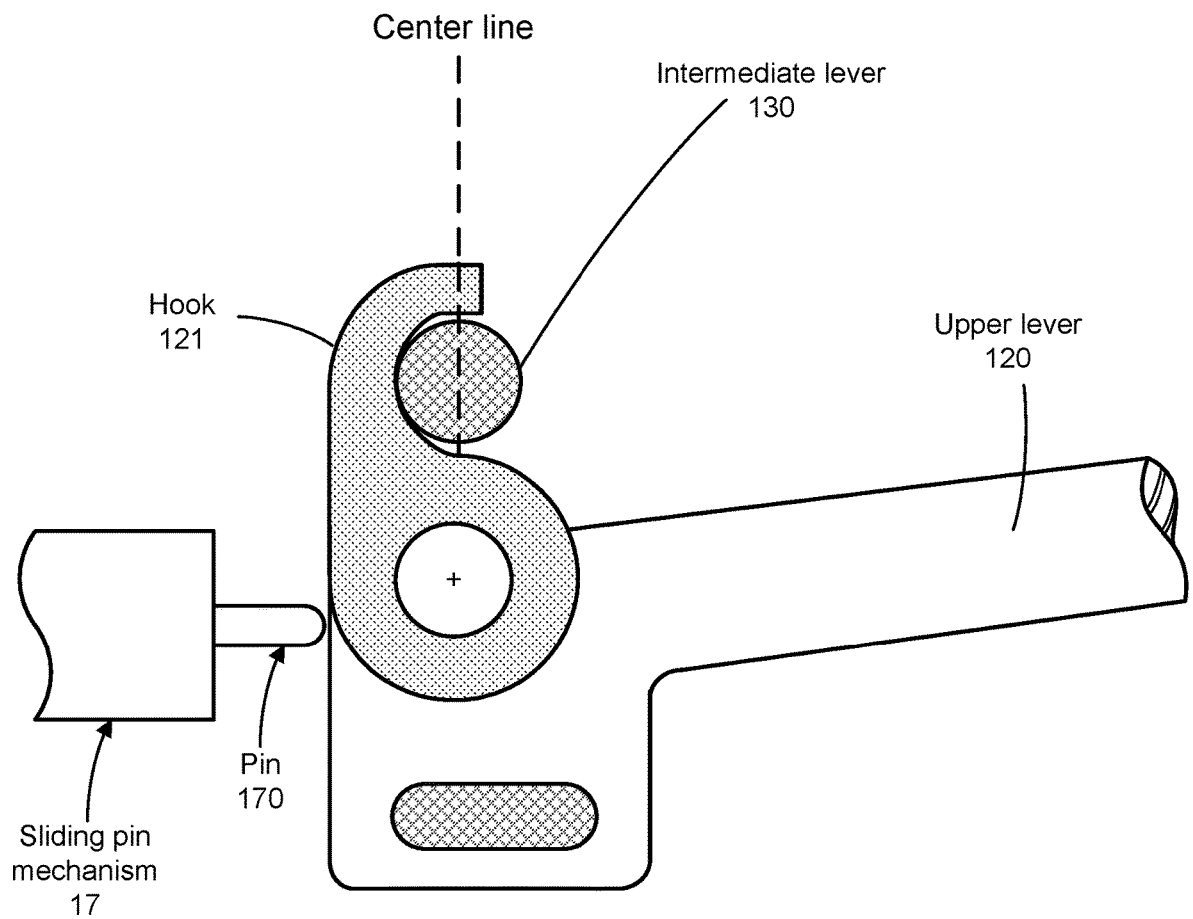
FIG. 11A illustrates components of an exemplary lever-lock release system in accordance with various exemplary embodiments.

Turning now to FIGS. 11A and 111B, in various exemplary embodiments lever-lock release system 100 may be configured with various components configured for particular use in connection with releasing (and/or retaining) a deployment line of a parachute. It will be appreciated that in connection with release of a deployment line, the more elements that are engaged, the more difficult the disengagement process. This is at least in part because sufficient tension force will have to be applied by the deployment line to disengage each engaged element due to the lack of gravity assist (as there would be during a midair release of a mass suspended by a drogue chute). Therefore, in these exemplary applications, it would be preferable if only a single ring of lever-lock release system 100 (for example, lower lever 140 having a generally "J" shape) was initially engaged.

Moreover, with momentary reference to U.S. Pat. No. 9,789,968 to Fox, it will be appreciated that if only the lowermost lever was initially engaged, it would be an extremely difficult task to cause the remaining levers to become engaged during the transition from a disengaged configuration to an engaged configuration. In contrast, via application of principles of the present disclosure and via use of lever-lock release system 100, a deployment line releasing task may be significantly easier because the lever-lock elements, other than the primary J-ring (i.e., lower lever 140), may be kept in their disengaged positions until the last instant when they are allowed to rotate to their engaged positions, and would thereafter be followed by a locking process.

In various exemplary embodiments, it will be appreciated that the final locking element shall provide some finite rotational/pivoting resistance to the final secondary element to prevent the devices from disengaging after they have become loaded by tension forces in the deployment line. Of course, multiple secondary rings/levers are effective in reducing the amount of anti-rotational/pivoting resistance that the final locking element shall provide. However, when the secondary element (e.g., upper lever 120) is equipped with oblong internal protrusions (e.g., protrusions 127), and the protrusions 127 are engaged with grooves 113 in the base 110, the secondary element (e.g., upper lever 120) could not rotate/pivot and the locking element would not need to resist this force. As a result, in this exemplary configuration only one secondary element (e.g., upper lever 120 or intermediate lever 130) would be needed, and the number of steps required to cause it to lock the larger J-ring element (e.g., lower lever 140) in place would be reduced to sliding the secondary element into the locking position and restraining it there. That being said, the need for a force to slide the revised secondary element into the engaged/locked position would remain.

Therefore, with reference now to FIG. 11A, in various exemplary embodiments an exemplary approach to accomplish this task is to again utilize sliding pin mechanism 17 or a similar component. Via operation of sliding pin mechanism 17, pin 170 may be extended from housing 175, applying a force to urge upper lever 120 into a locked position. It will be appreciated that, in these exemplary embodiments, upper lever 120 may be configured absent a "lever arm" portion and implement only a "hooking" portion.

Figure 11B:
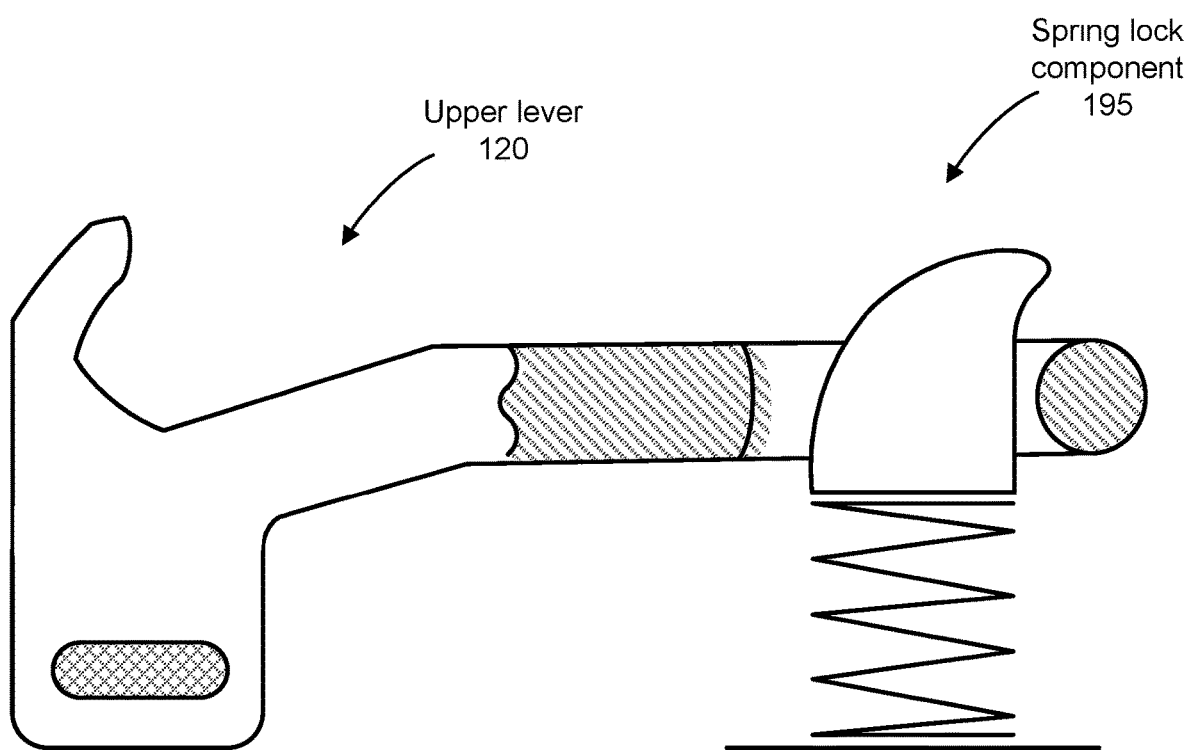
FIG. 11B illustrates components of an exemplary lever-lock release system in accordance with various exemplary embodiments.

However, in various exemplary embodiments and with reference to FIG. 11B, upper lever 120 may be configured with a "lever arm" portion and at least part of that portion may be utilized to cause upper lever 120 to assume a locked and/or unlocked position. For example, lever-lock release system 100 may utilize a spring lock component 195, for example passing through an aperture in upper lever 120.

With continued reference to FIG. 11B, operation of spring lock component 195 may occur as follows: upper lever 120 may be in a position farther to the "left" than depicted in FIG. 11B, such that upper lever 120 makes no contact with spring lock component 195. The bottom portion of spring lock component 195 may comprise an extended coil spring in a cavity such that the spring will compress when a downward force is applied to the upper portion of spring lock component 195. Upper lever 120 is slid to the "right" until it makes contact with the upper portion of spring lock component 195. As rightward movement of upper lever 120 continues, upper lever 120 applies a downward force on the upper portion of spring lock component 195, further compressing the coil spring. Eventually the coil spring is compressed enough for the rightmost side of upper lever 120 to pass over the top of spring lock component 195. Ultimately, as upper lever 120 continues its rightward motion, spring lock component 195 aligns with an aperture in upper lever 120 and the coiled spring expands, fixing spring lock component 195 in place with respect to upper lever 120 as depicted in FIG. 11B. At this point, upper lever 120 is locked in place via spring lock component 195 and remains in that position until an outside, downward force is applied to spring lock component 195 such that it is compressed sufficiently to allow upper lever 120 to move again.

While various exemplary embodiments have been discussed herein in connection with parachutes and payloads, it will be appreciated that principles of the present disclosure are more broadly applicable. For example, lever-lock release system 100 may be used in any circumstance where two or more objects need to be releasably connected; additionally, the releasing means can require relatively low energy due to the mechanical advantage provided by lever-lock release system 100. For an example, a relatively massive boat may be moored to a dock via lever-lock release system 100 and a pin pulling lanyard could extend back to the boat. Responsive to a pull on the lanyard, the mooring line would be released from the dock, thus obviating the requirement to have a dock-based means to perform the releasing function.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, various embodiments have been described. However, one of ordinary skill in the art appreciates that various modifications and changes can be made without departing from the scope of the present disclosure as set forth in the claims below. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A lever-lock release system, comprising:
    a rigid base having a first pivot point and a second pivot point;
    a first lever having a first end and a second end, wherein the first end is pivotally coupled to the rigid base via the first pivot point such that the first lever is rotatable with respect to the base; and
    a second lever having a first end and a second end, wherein the first end of the second lever is pivotally coupled to the rigid base via the second pivot point such that the second lever is rotatable with respect to the base,
    wherein the second end of the second lever is configured to overlappingly engage the first end of the first lever,
    wherein the first pivot point and the second pivot point are fixed with respect to the rigid base,
    wherein the first lever is coupled to the base via a pivot arm, and
    wherein the pivot arm and the first lever are rotatable with respect to one another.

2. The lever-lock release system of claim 1, wherein the base has a top end and a bottom end, and wherein the second lever is configured with a J-shape when viewed in a direction sideways to the top-to-bottom direction of the base.

3. The lever-lock release system of claim 1,
    wherein the first lever comprises a first hook,
    wherein the second lever comprises a second hook, and
    wherein, when the first lever is in a first rotational position with respect to the base, the first hook engages the second hook to retain the second lever in a fixed position.

4. The lever-lock release system of claim 1, wherein, when the first lever is in a second rotational position with respect to the base, the first hook releases the second hook to allow rotation of the second lever.

5. The lever-lock release system of claim 1, further comprising a retaining mechanism releasably coupled to the first lever, wherein the first lever and second lever are cascadingly rotatable with respect to the base responsive to release of the retaining mechanism.

6. The lever-lock release system of claim 1,
    wherein the first lever comprises a first hook and a first aperture,
    wherein the second lever comprises a second aperture, and
    wherein, when the first lever is in a first rotational position with respect to the base, the first hook extends at least partially through the second aperture to retain the second lever in a fixed position.

7. The lever-lock release system of claim 6, wherein, when the first lever is in a second rotational position with respect to the base, the first hook is at least partially withdrawn from the second aperture to allow the second lever to rotate with respect to the base.

8. The lever-lock release system of claim 7, wherein the first rotational position and the second rotational position differ by between 20 degrees and 30 degrees with respect to the base.

9. A lever-lock release system, comprising:
    a rigid base having a first pivot point and a second pivot point;
    a first lever having a first end and a second end, wherein the first end is pivotally coupled to the rigid base via the first pivot point such that the first lever is rotatable with respect to the base;
    a second lever having a first end and a second end, wherein the first end of the second lever is pivotally coupled to the rigid base via the second pivot point such that the second lever is rotatable with respect to the base; and a suspension sling of an aerial delivery payload releasably coupled to the second lever, wherein the second end of the second lever is configured to overlappingly engage the first end of the first lever, wherein the first pivot point and the second pivot point are fixed with respect to the rigid base, wherein the base has a top end and a bottom end, wherein the second lever is configured with a J-shape when viewed in a direction sideways to the top-to-bottom direction of the base, and wherein, responsive to rotation of the second lever, the suspension sling slides off the second lever.

10. A lever-lock release system, comprising:

a rigid base having a first pivot point and a second pivot point;

a first lever having a first end and a second end, wherein the first end is pivotally coupled to the rigid base via the first pivot point such that the first lever is rotatable with respect to the base;

a second lever having a first end and a second end, wherein the first end of the second lever is pivotally coupled to the rigid base via the second pivot point such that the second lever is rotatable with respect to the base; and a third lever coupled to the rigid base such that the third lever is rotatable with respect to the base, wherein the second end of the second lever is configured to overlappingly engage the first end of the first lever, wherein the first pivot point and the second pivot point are fixed with respect to the rigid base, wherein rotation of the first lever at least 20 degrees with respect to the base frees the second lever to rotate with respect to the base, wherein rotation of the second lever at least 20 degrees with respect to the base frees the third lever to rotate with respect to the base, and wherein the third lever is configured to slidably release a suspension sling of a payload responsive to rotation of the third lever with respect to the base.

11. The lever-lock release system of claim 1, wherein the first lever comprises a first hook disposed at the first end thereof, and wherein the first lever is configured to rotate toward the base to secure the second lever in a locked position with the first hook.

* * * * *